(12) United States Patent
Hiasa et al.

(10) Patent No.: US 8,743,245 B2
(45) Date of Patent: Jun. 3, 2014

(54) IMAGE PROCESSING METHOD, IMAGE PICKUP APPARATUS, IMAGE PROCESSING APPARATUS, AND NON-TRANSITORY COMPUTER-READABLE STORAGE MEDIUM

(75) Inventors: Norihito Hiasa, Utsunomiya (JP); Koshi Hatakeyama, Tokyo (JP)

(73) Assignee: Canon Kabushiki Kaisha (JP)

(*) Notice: Subject to any disclaimer, the term of this patent is extended or adjusted under 35 U.S.C. 154(b) by 14 days.

(21) Appl. No.: 13/585,995

(22) Filed: Aug. 15, 2012

(65) Prior Publication Data
US 2013/0044256 A1   Feb. 21, 2013

(30) Foreign Application Priority Data
Aug. 19, 2011   (JP) .................................. 2011-179460

(51) Int. Cl.
*H04N 5/262* (2006.01)
*H04N 5/232* (2006.01)
*H04N 5/225* (2006.01)
*G06K 9/40* (2006.01)
*G03H 1/22* (2006.01)

(52) U.S. Cl.
USPC ........... 348/239; 348/345; 348/335; 348/340; 348/218.1; 348/219.1; 382/255; 382/254; 382/263; 382/264; 359/32; 359/619; 359/698; 359/382; 250/201.4; 250/201.2; 250/347; 250/353

(58) Field of Classification Search
CPC ....... H04N 5/232; H04N 5/225; H04N 5/262; G06K 9/40; G01J 5/02; G02B 7/04; G02B 1/22; G02B 21/00; G02B 15/14; G02B 27/00; G03B 17/00; G03B 3/10

USPC ............ 348/360, 335, 355, 340, 345, 218.1, 348/219.1, 239; 382/255, 254, 263, 264; 359/32, 319, 383, 410, 426, 625, 626, 359/684, 698, 455, 619; 250/201.2, 201.4, 250/353, 347; 396/75, 79, 80, 133
See application file for complete search history.

(56) References Cited
U.S. PATENT DOCUMENTS

2007/0252074 A1 * 11/2007 Ng et al. ..................... 250/208.1
2009/0128669 A1 * 5/2009 Ng et al. ....................... 348/241
(Continued)

OTHER PUBLICATIONS

Isaksen, et al., "Dynamically Reparameterized Light Fields", ACM Siggraph, pp. 297-306, 2000.
(Continued)

*Primary Examiner* — Tuan Ho
*Assistant Examiner* — Marly Camargo
(74) *Attorney, Agent, or Firm* — Rossi, Kimms & McDowell LLP

(57) ABSTRACT

An image processing method includes the steps of obtaining an input image that is an image in which information of an object space is obtained from a plurality of points of view using an image pickup apparatus that includes an image pickup element having a plurality of pixels and an imaging optical system, calculating a first position of a virtual imaging plane that corresponds to a specified focus position, setting the virtual imaging plane to a second position that is in a range of a depth of focus of the imaging optical system with reference to the first position so that a maximum value of an apparent pixel pitch that is formed by reconstructing the input image is decreased, and generating an output image in a state where the virtual imaging plane is set to the second position.

12 Claims, 18 Drawing Sheets

(56) References Cited

U.S. PATENT DOCUMENTS

| | | | |
|---|---|---|---|
| 2009/0140131 A1* | 6/2009 | Utagawa | 250/226 |
| 2009/0185801 A1* | 7/2009 | Georgiev et al. | 396/332 |
| 2009/0190024 A1* | 7/2009 | Hayasaka et al. | 348/360 |
| 2011/0129165 A1* | 6/2011 | Lim et al. | 382/255 |
| 2012/0229691 A1* | 9/2012 | Hiasa et al. | 348/340 |
| 2013/0057749 A1* | 3/2013 | Hiasa et al. | 348/340 |
| 2013/0308035 A1* | 11/2013 | Hiasa et al. | 348/340 |
| 2013/0329120 A1* | 12/2013 | Hiasa et al. | 348/345 |

OTHER PUBLICATIONS

Ng, et al., "Light Field Photography With a Hand-Held Plenoptic Camera", Computer Science Technical Report CTSR, 2005.

Georgiev, et al., "Superresolution with Plenoptic 2.0 Cameras", Optical Society of America, 2009.

* cited by examiner

IMAGE PROCESSING METHOD, IMAGE PICKUP APPARATUS, IMAGE PROCESSING APPARATUS, AND NON-TRANSITORY COMPUTER-READABLE STORAGE MEDIUM

BACKGROUND OF THE INVENTION

1. Field of the Invention

The present invention relates to an image pickup apparatus that obtains a two-dimensional light intensity distribution and angle information of a ray in an object space, and an image processing method for the image obtained by the image pickup apparatus.

2. Description of the Related Art

Recently, an image pickup apparatus that performs a calculation using data obtained by an image pickup element and performs a corresponding digital image processing so as to output various images is proposed. Ren Ng, et al., "Light Field Photography with a Hand-held Plenoptic Camera", 2005 Computer Science Technical Report CTSR, Todor Georgiev, et al., "Superresolution with Plenoptic 2.0 Camera", 2009 Optical Society of America, and Aaron Isaksen, et al., "Dynamically Reparameterized Light Fields" and ACM SIGGRAPH and pp. 297-306 (2000), disclose an image pickup apparatus that obtains the two-dimensional light intensity distribution and the angle information of the ray in the object space using "Light Field Photography". The two-dimensional light intensity distribution and the angle information of the ray are collectively referred to as a light field, and three-dimensional information in the object space can be obtained by obtaining the light field. According to such an image pickup apparatus, the light field is obtained and an image processing is performed after taking an image so that a focus position of the image called a refocus, a shot point of view, a depth of field, or the like can be changed.

However, such an image pickup apparatus needs to use pixels of the image pickup element for storing the angle information of the ray, in addition to storing the two-dimensional light intensity distribution. Therefore, the spatial resolution is deteriorated with respect to an image pickup apparatus which only stores the two-dimensional light intensity distribution. Todor Georgiev, et al., "Superresolution with Plenoptic 2.0 Camera", 2009 Optical Society of America, discloses a configuration in which a certain point on an image plane that is formed by an imaging optical system is taken by a plurality of small lenses constituting a lens array. A plurality of small images obtained like this are reconstructed so that the resolution of the reconstructed image can be improved. Such a method of improving the resolution is referred to as a "pixel shift effect".

However, Todor Georgiev, et al., "Superresolution with Plenoptic 2.0 Camera", 2009 Optical Society of America, only describes a specific focus position as a method of obtaining the effect of the super-resolution from subpixel shift. When an image is generated at a different focus position in accordance with the refocus, the effect of the super-resolution from subpixel shift is changed in accordance with the focus position and the spatial resolution is deteriorated.

SUMMARY OF THE INVENTION

The present invention provides an image processing method that is capable of reducing the dependency of a focus position for resolution of a refocus image so as to obtain a high-resolution refocus image.

An image processing method as one aspect of the present invention is capable of reconstructing an input image to generate a plurality of output images that have different focus positions, and includes the steps of obtaining the input image that is an image in which information of an object space is obtained from a plurality of points of view using an image pickup apparatus that includes an image pickup element having a plurality of pixels and an imaging optical system, calculating a first position of a virtual imaging plane that corresponds to a specified focus position, setting the virtual imaging plane to a second position that is in a range of a depth of focus of the imaging optical system with reference to the first position so that a maximum value of an apparent pixel pitch that is formed by reconstructing the input image is decreased, and generating the output image in a state where the virtual imaging plane is set to the second position.

An image pickup apparatus as another aspect of the present invention is capable of reconstructing an input image to generate a plurality of output images that have different focus positions, and includes an imaging optical system, an image pickup element that includes a plurality of pixels, a lens array configured so that rays from the same position of an object plane enter pixels of the image pickup element that are different from each other in accordance with a pupil region of the imaging optical system through which the ray passes, and an image processing portion configured to generate the output image using the image processing method for the input image obtained by the image pickup element. The lens array is disposed on an image side conjugate plane of the imaging optical system with respect to the object plane.

An image pickup apparatus as another aspect of the present invention is capable of reconstructing an input image to generate a plurality of output images that have different focus positions, and includes an imaging optical system, an image pickup element that includes a plurality of pixels, a lens array configured so that rays from the same position of an object plane enter pixels of the image pickup element that are different from each other in accordance with a pupil region of the imaging optical system through which the ray passes, and an image processing portion configured to generate the output image using the image processing method for the input image obtained by the image pickup element. The lens array is disposed so that an image side conjugate plane of the imaging optical system with respect to the object plane is conjugate to the image pickup element.

An image pickup apparatus as another aspect of the present invention is capable of reconstructing an input image to generate a plurality of output images that have different focus positions, and includes an imaging optical system that includes a plurality of optical systems each having a positive refractive power, at least one image pickup element that includes a plurality of pixels, and an image processing portion configured to generate the output image using the image processing method for the input image obtained by the image pickup element. The plurality of optical systems are arranged so that rays from the same position of an object plane enter pixels of the image pickup element that are different from each other in accordance with a pupil region of the imaging optical system through which the ray passes, and a pupil of the imaging optical system is a combined pupil that is obtained by combining pupils of the plurality of optical systems.

An image processing apparatus as another aspect of the present invention is capable of reconstructing an input image to generate a plurality of output images that have different focus positions, and includes a storage portion configured to store image pickup condition information of the input image, and an image processing portion configured to generate the output image using the image pickup condition information for the input image. The image processing portion performs an image processing method including the steps of obtaining the input image that is an image in which information of an object space is obtained from a plurality of points of view using an image pickup apparatus that includes an image pickup element having a plurality of pixels and an imaging optical system, calculating a first position of a virtual imaging plane that corresponds to a specified focus position, setting the virtual imaging plane to a second position that is in a range of a depth of focus of the imaging optical system with reference to the first position so that a maximum value of an apparent pixel pitch that is formed by reconstructing the input image is decreased, and generating the output image in a state where the virtual imaging plane is set to the second position.

A non-transitory computer-readable storage medium as another aspect of the present invention stores a process for causing an information processing apparatus to execute a method capable of reconstructing an input image to generate a plurality of output images that have different focus positions, and the method includes the steps of obtaining the input image that is an image in which information of an object space is obtained from a plurality of points of view using an image pickup apparatus that includes an image pickup element having a plurality of pixels and an imaging optical system, calculating a first position of a virtual imaging plane that corresponds to a specified focus position, setting the virtual imaging plane to a second position that is in a range of a depth of focus of the imaging optical system with reference to the first position so that a maximum value of an apparent pixel pitch that is formed by reconstructing the input image is decreased; and generating the output image in a state where the virtual imaging plane is set to the second position.

An image pickup apparatus as another aspect of the present invention includes an imaging optical system, an image pickup element that includes a plurality of pixels, and a lens array configured so that rays from the same position of an object plane enter pixels of the image pickup element that are different from each other in accordance with a pupil region of the imaging optical system through which the ray passes. The lens array is disposed so that an image side conjugate plane of the imaging optical system with respect to the object plane is conjugate to the image pickup element, and an appropriate conditional expression is met.

Further features and aspects of the present invention will become apparent from the following description of exemplary embodiments with reference to the attached drawings.

DESCRIPTION OF THE PREFERRED EMBODIMENTS

Figure 1:
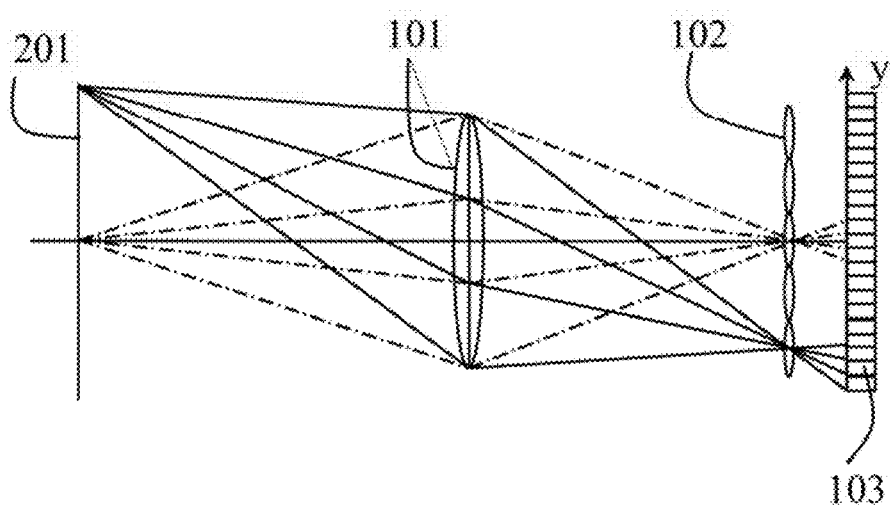
FIG. 1 is a schematic configuration diagram of an image pickup optical system in Embodiment 1.

Exemplary embodiments of the present invention will be described below with reference to the accompanied drawings. In each of the drawings, the same elements will be denoted by the same reference numerals and the duplicate descriptions thereof will be omitted.

An image processing method of the present embodiment can reconstruct an input image so as to generate a plurality of output images that have focus positions different from each other. This input image is an image that is obtained by an image pickup apparatus as follows. In other words, the image pickup apparatus is provided with a plurality of optical systems that have positive refractive power or a lens array that is disposed at an image side of an imaging optical system so that a light field can be obtained.

FIGS. 1 to 4 are an example of the image pickup optical system that constitutes such an image pickup apparatus. The image pickup optical system is configured by including an imaging optical system and an image pickup element, which is configured by including a lens array if the lens array is provided. A human or an object does not need to exist on an object plane 201 illustrated in FIGS. 1 to 4. This is because focusing can be performed for the human or the object that exists behind or in front of the object plane 201 by performing a reconstruction processing after taking an image. Descriptions in each of the following embodiments will use a one-dimensional system for easy understanding, but the same is true for a two-dimensional system.

Embodiment 1

Figure 5:
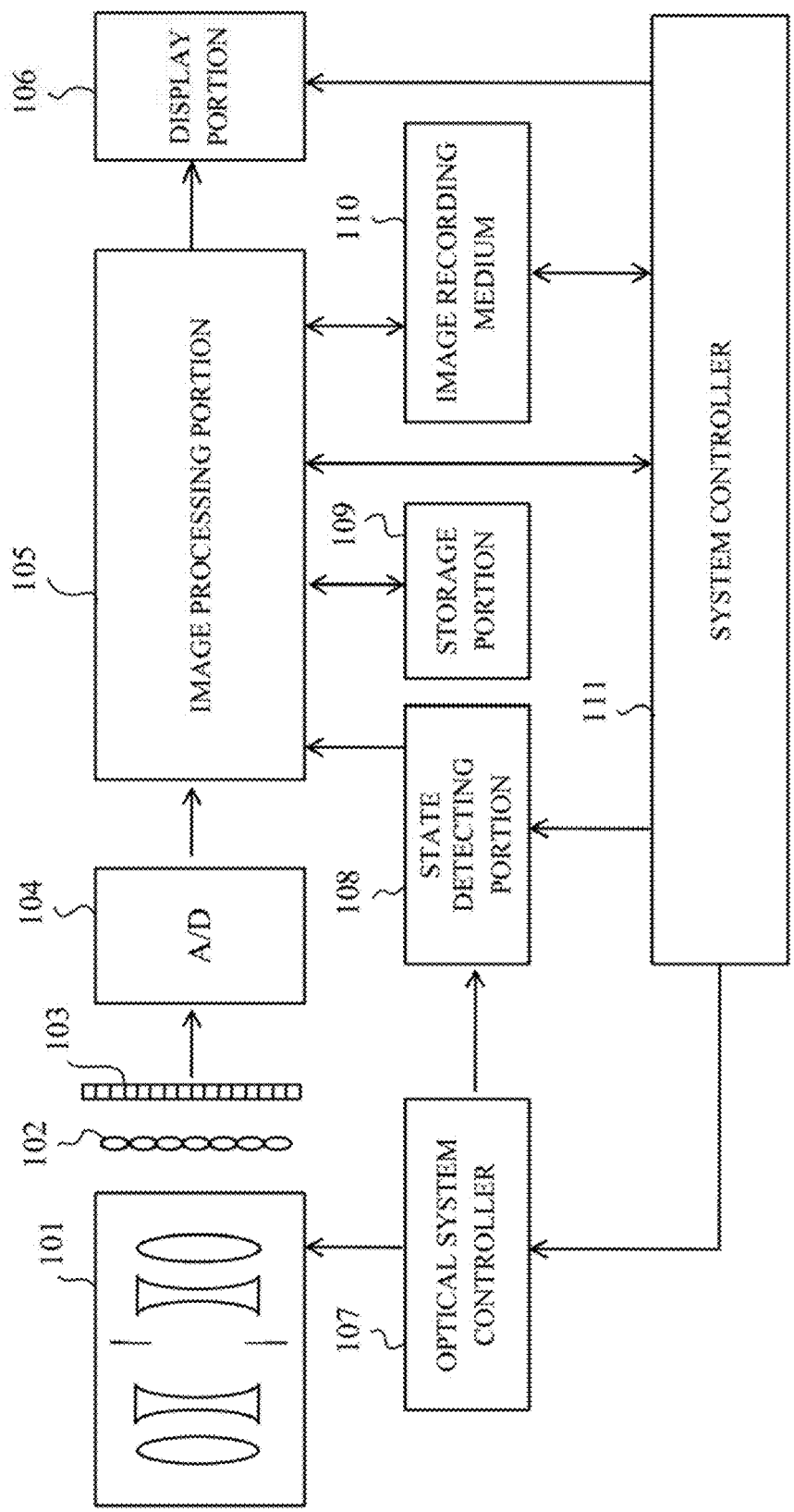
FIG. 5 is a block diagram of an image pickup apparatus in each of Embodiments 1 to 4.

First of all, referring to FIG. 5, a configuration of an image pickup apparatus in Embodiment 1 of the present invention will be described. FIG. 5 is a block diagram of the image pickup apparatus in the present embodiment. An image processing method of the present embodiment is performed by an image processing portion 105 of the image pickup apparatus.

An image pickup element 103 is a two-dimensional image pickup element such as a CCD (Charge Coupled Device) or a CMOS (Complementary Metal-Oxide Semiconductor), which includes a plurality of pixels. An energy of a ray that enters the image pickup element 103 via an imaging optical system 101 (a main lens unit) and a lens array 102 is converted to an electric signal (an analog signal), and the analog signal is converted to a digital signal by an A/D converter 104. A predetermined processing is performed for this digital signal by the image processing portion 105, and then it is stored in a predetermined format in an image recording medium 110 such as a semiconductor memory. In this case, image pickup condition information of the image pickup apparatus that is obtained from a state detecting portion 108 is also stored at the same time. The image pickup condition information means an object distance, an aperture, a focal length of a zoom lens, or the like. The state detecting portion 108 may directly obtain the image pickup condition information from a system controller 111, and with respect to information related to the image pickup optical system, the state detecting portion 108 can also obtain it from an optical system controller 107.

When the image stored in the image recording medium 110 is displayed on a display portion 106, a reconstruction processing is performed by the image processing portion 105 based on the image pickup condition information. As a result, an image reconstructed so as to be desired point of view, focus position, or depth of field is displayed on the display portion 106. In order to perform a high speed operation, a desired image setting (a point of view, focusing, a depth of field, or the like) may also be previously stored in a storage portion 109 so that a reconstructed image is directly displayed on the display portion 106 without involving the image recording medium 110. Furthermore, the image recorded in the image recording medium 110 may also be the reconstructed image. Series of the controls described above are performed by the system controller 111, and a mechanical drive of the image pickup optical system is performed by the image pickup optical system controller 107 based on an instruction of the system controller 111.

Figure 6:
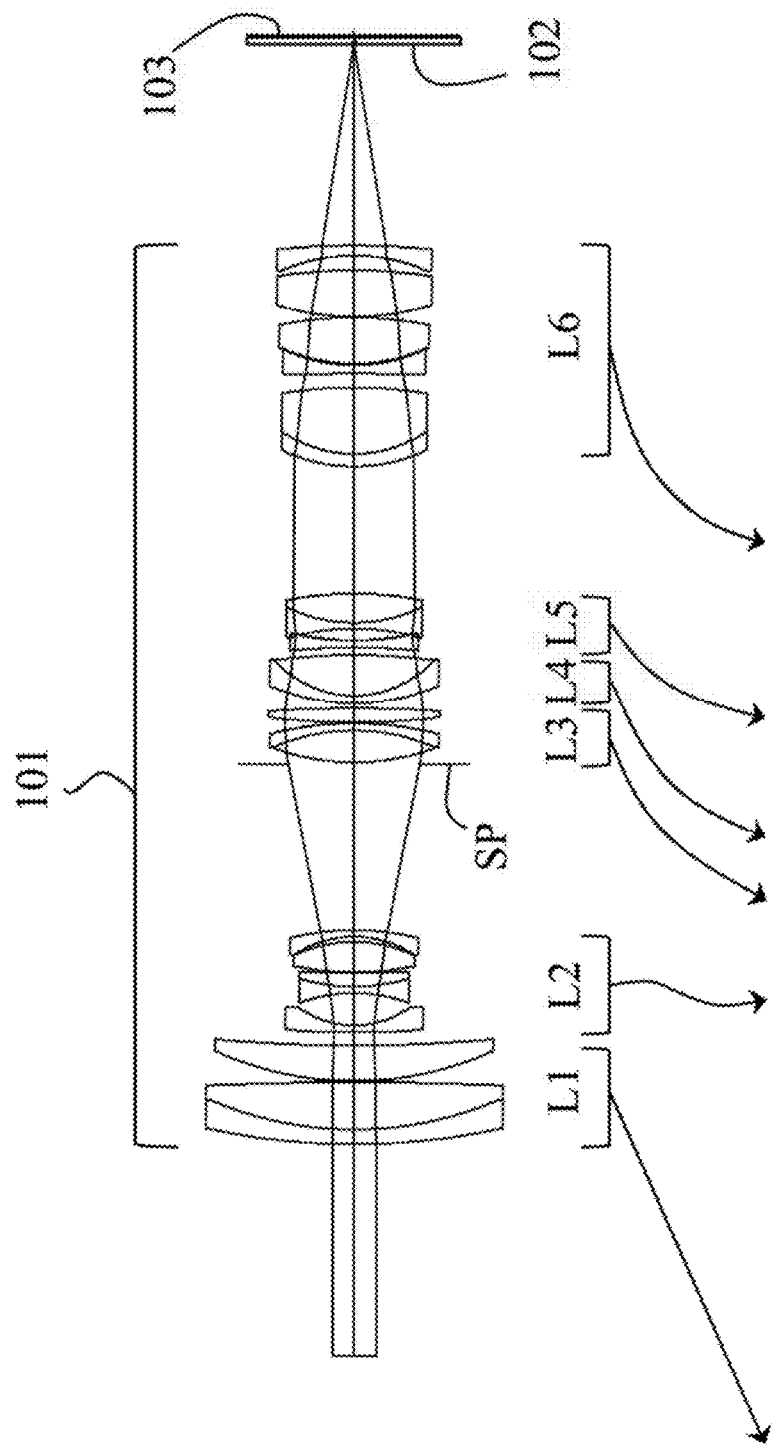
FIG. 6 is a cross-sectional diagram of the image pickup optical system in Embodiment 1.

Next, referring to FIGS. 1 to 6, a configuration of the image pickup optical system in the present embodiment will be described. FIG. 1 is a schematic configuration diagram of the image pickup optical system. FIG. 6 is a cross-sectional diagram of the image pickup optical system. The image pickup optical system is configured by including an imaging optical system 101, a lens array 102, and an image pickup element 103. In the present embodiment, the lens array 102 is configured by using a plurality of lenses (small lenses), and the small lens is configured by a solid lens. However, the present embodiment is not limited to this, and the lens array 102 may also be configured by using a liquid lens, a liquid crystal lens, a diffractive optical element, or the like. The small lens that constitutes the lens array 102 has surfaces at both sides each having a convex shape. However, the present embodiment is not limited to this, and the small lens may also have the surface at one side having a planar shape and the surface at the other side having a convex shape.

The lens array 102 is disposed at an image side conjugate plane with respect to an object plane 201 of the imaging optical system 101. The lens array 102 is configured so that an exit pupil of the imaging optical system 101 and the image pickup element 103 substantially have a conjugate relation. A ray from the same position on the object plane 201 passes through the imaging optical system 101 and the lens array 102, and then enter pixels of the image pickup element 103 which are different from each other in accordance with a position and an angle of this ray on the object plane 201 so as to obtain a light field. The lens array 102 functions as preventing the ray passing through the positions different from each other on the object plane 201 from entering the same pixel. As a result, an image in which pixel groups that are obtained by taking the same area on the object plane 201 from a plurality of points of view are arrayed is obtained by the image pickup element 103. In the configuration illustrated in FIG. 1, three pixels (nine pixels in a two dimension) take the same position on the object plane 201. Therefore, the image pickup optical system of the present embodiment has a two-dimensional spatial resolution that is deteriorated to 1/9 with respect to an image pickup optical system that obtains only a two-dimensional light intensity distribution. This is qualitatively the same even when the number of pixels that take the same position on the object plane 201 is changed.

Figure 7A:
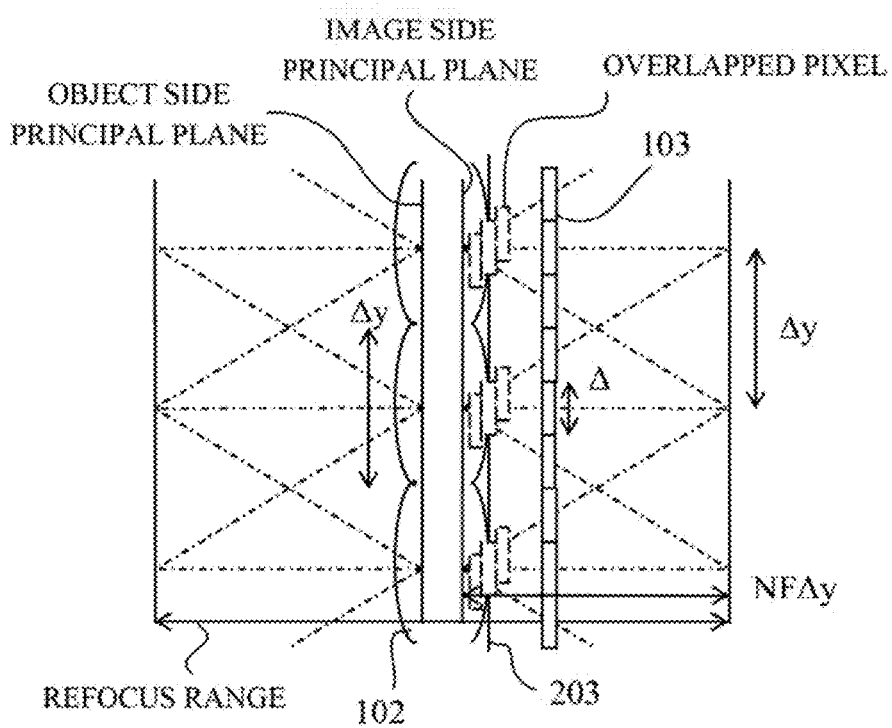
FIGS. 7A and 7B are diagrams of describing refocus image generation in Embodiment 1.
Figure 7B:
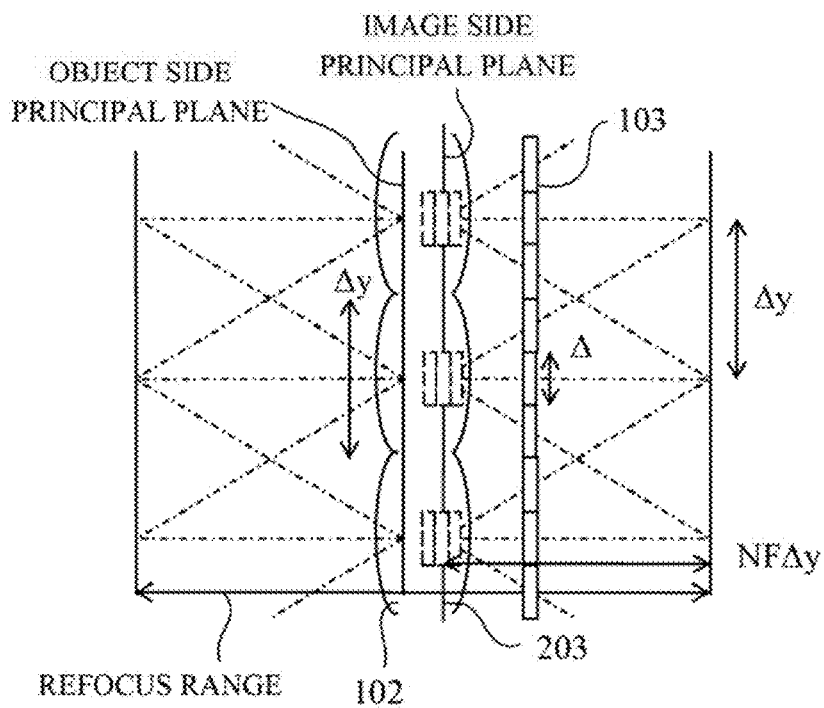

Subsequently, a refocus processing in the present embodiment will be described. With regard to the refocus processing, since details are described in "Fourier Slice Photography" (Ren Ng, 2005, ACM Trans. Graph. 24, 735-744), it is easily described in the embodiment. Referring to FIGS. 7A and 7B, one example of methods of generating a refocus image is described. FIGS. 7A and 7B are diagrams of illustrating parts of the lens array 102 and the image pickup element 103 in the image pickup optical system that is illustrated in FIG. 1 in detail. Dashed-dotted lines in FIGS. 7A and 7B extend a pathway of a ray that passes through a center of each pixel and an image side principal point of the small lens corresponding to this pixel. A virtual imaging plane 203 is an image side conjugate plane of the imaging optical system 101 with respect to a surface at an object side on which the focusing is performed by the refocus processing. However, in the present embodiment, when the image side conjugate plane is positioned at an image side relative to an object side principal plane of the lens array 102, a surface that is moved to the image side by a principal plane interval of the lens array 102 is the virtual imaging plane 203. A parallel translation is performed for pixel values that are obtained by the image pickup element 103 to move to the virtual imaging plane 203 along the dashed-dotted line so as to combine them, and thus a refocus image can be generated at a desired focusing position.

For example, in order to generate an image that is focused on the object plane 201 in FIG. 1, as illustrated in FIG. 7B, the virtual imaging plane 203 may be set to a surface that is conjugate to the object plane 201 via the imaging optical system 101, i.e. the principal plane (the image side principal plane) of the lens array 102. In FIGS. 7A and 7B, the pixels for which the parallel translation is performed in generating the refocus image are represented by dashed lines, and they are depicted by shifting them instead of overlapping them for easy understanding. As illustrated in FIGS. 7A and 7B, when a pupil region of the imaging optical system 101 through which light beams entering pixels pass is the same in generating an arbitrary refocus image, it is understood that the pixels have the same parallel translation amount. Accordingly, the operation of the pixel at the time of generating the refocus image is determined in accordance with the pupil region of the imaging optical system 101 through which the light beam entering the pixel passes.

Next, a range in which the refocus processing can be performed will be described. Since an opening diameter of the imaging optical system 101 is limited, an angle component of the light field that is obtained by the image pickup element 103, i.e. parallax information, is also limited. Therefore, the range in which the refocus processing can be performed is limited to a finite range. In the embodiment, the two-dimensional light intensity distribution is referred to as a spatial component of a light field. In this case, the refocus range is determined by a sampling pitch $\Delta y$ of the spatial component and a sampling pitch $\Delta u$ of the angle component, and its coefficient $\alpha_{\pm}$ is given as the following Expression (1).

$$\alpha_{\pm} = \frac{1}{1 \pm \Delta y / \Delta u} \quad (1)$$

The refocus range $\alpha_+ s_2 \sim \alpha_- s_2$ at the image side that are represented by using Expression (1) and the conjugate range with respect to the imaging optical system 101 are a refocus range at the object side. In the embodiment, symbol $s_2$ is an interval between the image side principal plane of the imaging optical system 101 and the image side conjugate plane of the imaging optical system 101 with respect to the object plane 201.

Figure 8:
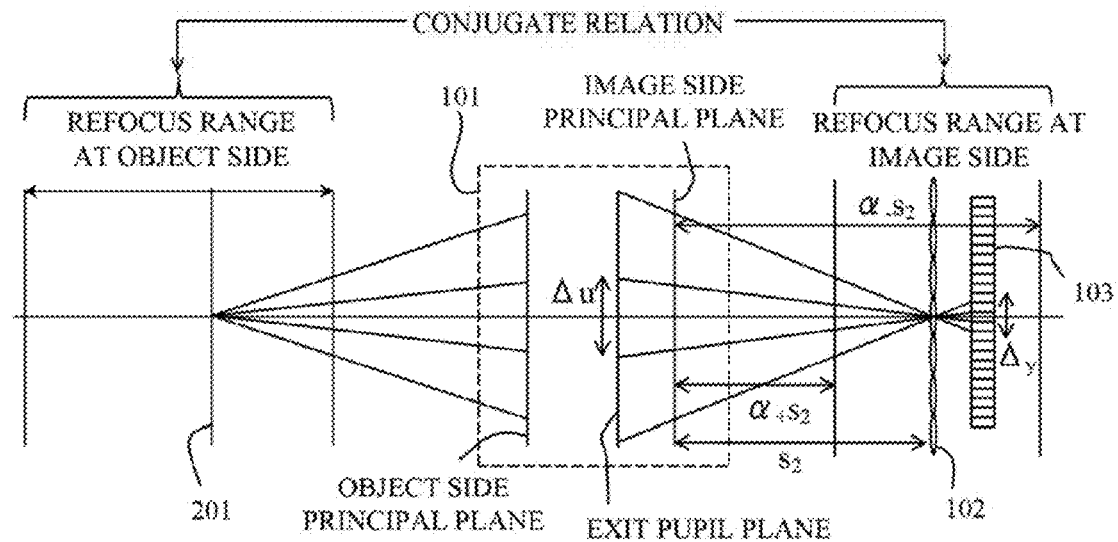
FIG. 8 is a diagram of describing a refocus range in Embodiment 1.

FIG. 8 is a diagram of describing the refocus range. In a configuration example illustrated in FIG. 8, since a one-dimensional cycle of the lens array 102 is three pixels, the sampling pitch $\Delta y$ of the spatial component is three times as large as a pixel pitch of the image pickup element 103. Since the exit pupil of the imaging optical system 101 is divided into three regions (nine regions in the two dimension), the sampling pitch $\Delta u$ of the angle component is ⅓ of the diameter of the exit pupil. When a range exceeds the refocus range that is represented by Expression (1), the information is insufficient in the obtained light field and a correct refocus image cannot be generated. Since the pixel pitch $\Delta$ of the image pickup element 103 is sufficiently small with respect to an exit pupil distance P of the imaging optical system 101, Expression (1) can be approximated as represented by the following Expression (2).

$$\alpha_{\pm} s_2 = s_2 \mp NF\Delta y = s_2 \mp NF\Delta_{LA} \quad (2)$$

In the embodiment, the exit pupil distance P of the imaging optical system 101 means a distance between an exit pupil plane of the imaging optical system 101 and the image side conjugate plane of the imaging optical system 101 with respect to the object plane 201. Symbol N denotes a one-dimensional division number of the pupil of the imaging optical system 101, symbol F denotes an F-number of the imaging optical system 101, and symbol $\Delta_{LA}$ denotes a pitch of the lens array 102. When a parallel translation of a pixel group corresponding to a certain small lens is performed along the dashed-dotted line of FIGS. 7A and 7B, the interval of each pixel is larger than the sampling pitch $\Delta y$ at the time of exceeding the maximum refocus amount of Expression (2), and a region where the information lack is generated. In this case, a correct refocus image cannot be generated.

Next, the super-resolution from subpixel shift at the time of the image reconstruction will be described. Referring to FIG. 7A, on the virtual imaging plane 203, pixels for which the parallel translation has been performed are shifted from each other and are overlapped (overlapped pixels). Combining these pixels, an apparent pixel pitch can be reduced. This is called a super-resolution from subpixel shift. On the other hand, as illustrated in FIG. 7B, when the pixels for which the parallel translation has been performed are coincident and overlapped without being shifted from each other, the effect of the super-resolution from subpixel shift cannot be obtained, and a high resolution cannot be obtained. Since the shift of the overlapped pixels changes in accordance with the position of the virtual imaging plane 203 to which the pixel is moved by the parallel translation, the effect of the super-resolution from subpixel shift also changes in accordance with the virtual imaging plane 203.

In the embodiment, a maximum pixel pitch in the apparent pixel pitches that have been decreased by the super-resolution from subpixel shift is defined as determining the resolution of the refocus image. The pixel pitch that determines the resolution is referred to as a maximum value of the apparent pixel pitch. In this case, the number of pixels in one-dimensional direction that take the same region of the object plane 201 is m pixels. Symbol m corresponds to the one-dimensional pupil division number of the imaging optical system 101. When the pixels are shifted by 1/m pixel, the maximum value of the apparent pixel pitch is the minimum, and the resolution of the refocus image is the highest.

Figure 9:
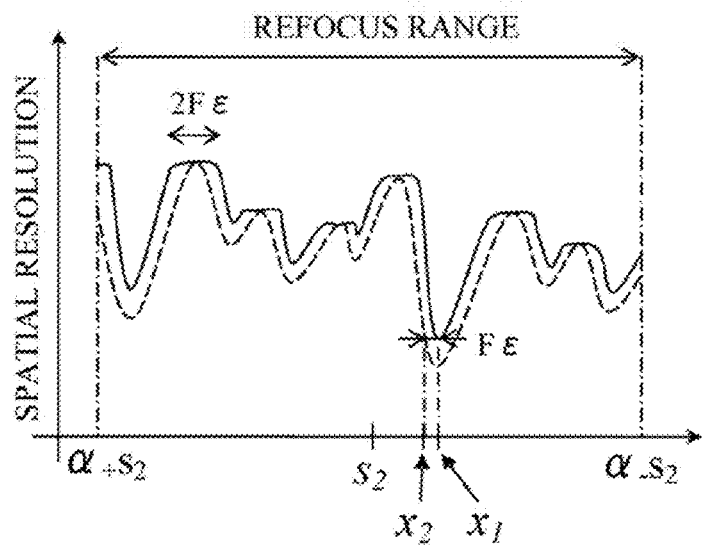
FIG. 9 is a schematic diagram of describing a relationship between a position of a virtual imaging plane and a resolution of a refocus image in each of Embodiments 1 to 6.

The state illustrated in FIG. 7A indicates a case of m=3, which is a state where the resolution of the refocus image is the highest since each pixel is shifted by ⅓ on the virtual imaging plane 203. Referring to FIG. 7A, it is understood that four points indicating the focus positions of the refocus image at which the same effect can be obtained exist in the refocus range. On the contrary, when the pixels for which the parallel translation have been performed are coincident and are overlapped with each other as illustrated in FIG. 7B, the super-resolution from subpixel shift cannot be performed. A dashed line in FIG. 9 schematically indicates this relation. FIG. 9 is a diagram of illustrating a schematic relationship between the position of the virtual imaging plane 203 and the resolution of the refocus image. A lateral axis of FIG. 9 indicates the position of the virtual imaging plane 203, and a vertical axis indicates the spatial resolution of the refocus image including the super-resolution from subpixel shift. As illustrated in FIG. 9, the spatial resolution is changed in accordance with the position of the virtual imaging plane 203.

Figure 10:
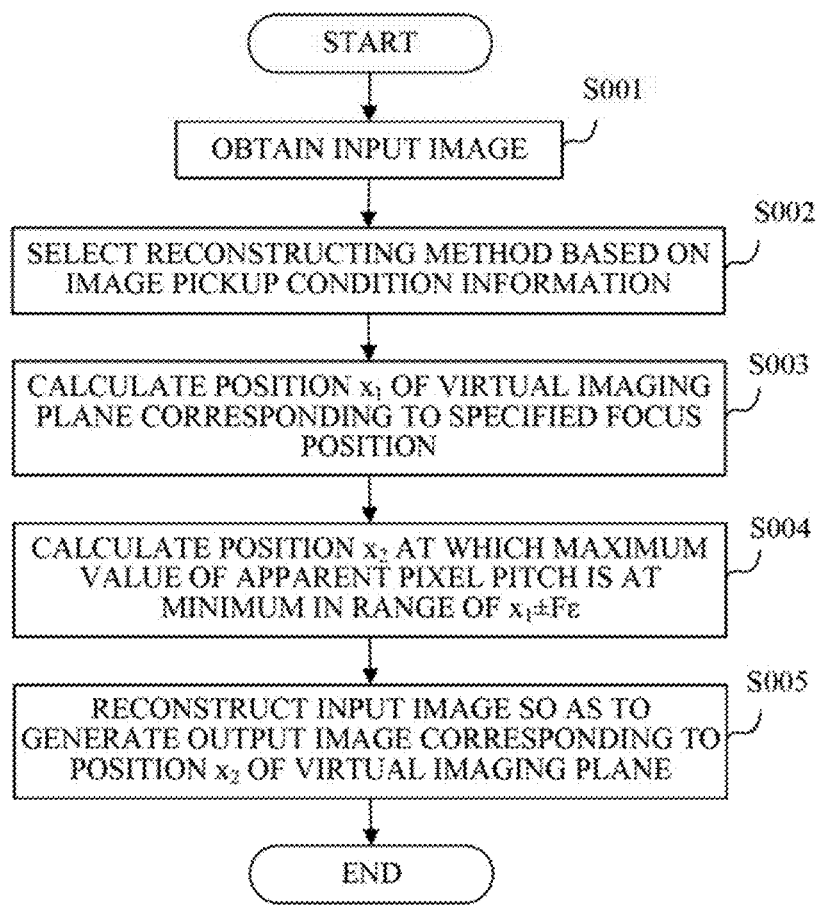
FIG. 10 is a flowchart of an image processing method in each of Embodiments 1 to 6.

As above, the configuration of the image pickup optical system in the present embodiment, the generation of the refocus image, and the resolution have been described. Next, referring to FIG. 10, an image processing method that generates an output image from an input image will be described. FIG. 10 is a flowchart of the image processing method in the present embodiment. Each step in the flowchart of FIG. 10 is performed by the image processing portion 105.

First of all, in Step S001, an input image that is taken by the image pickup optical system illustrated in FIG. 6 is obtained. Specifically, rays from the same position on the object plane 201 enter pixels different from each other on the image pickup element 103 in accordance with the pupil region of the imaging optical system 101 so as to obtain the input image. A method of storing the light field contained in the input image is changed in accordance with the configuration of the image pickup optical system. In the present embodiment, it is stored as an image in which pixel groups that take an image of the same region on the object plane 201 from a plurality of points of view are arrayed. Alternatively, the input image may also be an image stored in the image recording medium 110, which was taken by the same image pickup optical system.

Subsequently, in Step S002, a method of reconstructing the image is determined based on image pickup condition information (information related to the configuration of the image pickup optical system) contained in the input image. Since the image pickup optical system of the present embodiment has the configuration as illustrated in FIG. 1, the method of generating the refocus image illustrated in FIG. 7A is used as a method of reconstructing the image. However, if a method that is qualitatively similar to the method of generating the refocus image illustrated in FIG. 7A, details of the method of reconstructing the image may also be different. When the image pickup optical system has a configuration of any one of FIGS. 2 to 4 or another configuration, a different method of reconstructing the image is used in accordance with its configuration. However, when the configuration of the image pickup optical system is not changed, a single method is used as a method of reconstructing the image, and Step S002 does not need to be performed.

Next, in Step S003 (a first setting step), a user specifies a position (a focus position) at which the focusing is performed in an image that is to be generated, and a position $x_1$ (a first position) of the virtual imaging plane 203 corresponding to it is calculated or set. In other words, the position $x_1$ of the virtual imaging plane 203 that corresponds to the specified focus position is calculated. The position $x_1$ is referred to as a fist focus position. In order to generate a correct image by the refocus processing, the position $x_1$ needs to be in the refocus range that is represented by Expression (2). Therefore, it is preferred that the position $x_1$ meet the following Conditional expression (3).

$$-1 \le \frac{x_1 - s_2}{NF\Delta y} \le 1 \qquad (3)$$

In the configuration of the image pickup optical system of the present embodiment, $\Delta y = \Delta_{LA}$ is met. The focus position that is specified by the user may be any one of a focus position at the object side and a focus position at the image side. When the focus position at the object side is specified, the first focus position is a plane which is conjugate to the specified focus position via the imaging optical system 101. On the other hand, when the focus position at the image side is specified, the focus position at the image side itself is the first focus position.

Subsequently, in Step S004 (a second setting step), a focus position of the output image is determined. As described above, the effect of the super-resolution from subpixel shift is changed in accordance with the position of the virtual imaging plane 203. Therefore, at the position $x_1$ (the first position) that corresponds to the focus position specified by the user, there is a case where a sufficient effect of the super-resolution from subpixel shift cannot be obtained. However, if it is in a depth of focus of the imaging optical system 101, there is no problem even when the position of the virtual imaging plane 203 that corresponds to the output image is changed from the position $x_1$. Therefore, if the virtual imaging plane 203 on which the effect of the super-resolution from subpixel shift is maximized in the depth of focus is selected from the position $x_1$, the output image which has high resolution and is focused on the focus position specified by the user can be generated. Therefore, in Step S004, the virtual imaging plane 203 on which the effect of the super-resolution from subpixel shift is maximized is reset. A position $X_2$ (a second position) of the virtual imaging plane 203 that corresponds to this output image is referred to as a second focus position. At the position $x_2$, the maximum value of the apparent pixel pitch is minimized since the effect of the super-resolution from subpixel shift is maximized.

When a diameter of a permissible circle of confusion is $\epsilon$, the depth of focus of the imaging optical system 101 is approximately represented by $\pm F\epsilon$. Therefore, the following Conditional Expression (4) is introduced.

$$0 \le \frac{x_1 - x_2}{F\varepsilon} \le 1 \qquad (4)$$

In Conditional Expression (4), symbol $\epsilon$ is a value that is determined by the performance necessary for the image pickup apparatus. For example, $\epsilon$ is determined so that a difference between spread of a point image in the depth of focus and spread of a point image at the focus position cannot be sensed by the user. Specifically, it is preferred that $\epsilon$ be set not less than the maximum value of the apparent image pitch and not more than five times of $\Delta_{LA}$.

FIG. 9 schematically illustrates an effect of generating the refocus image at the position $x_2$ at which the high resolution is obtained in the depth of focus. The position $x_1$ in FIG. 9 is the first focus position which corresponds to the focus position specified by the user, and the position $x_2$ is the second focus position at which the effect of the super-resolution from subpixel shift is maximized in the depth of focus $\pm F\epsilon$. Considering the depth of focus, the effect of the super-resolution from subpixel shift can be obtained at the position $x_2$ while focusing on the focus position specified by the user. This effect is indicated by a solid line in FIG. 9. The dependency of the position of the virtual imaging plane 203 with respect to the spatial resolution is deteriorated compared to the dashed line that indicates the case of the position $x_1$.

In the present embodiment, the position $x_2$ is set as a position of the virtual imaging plane 203 at which the maximum value of the apparent pixel pitch is the minimum in the depth of focus. However, the embodiment is not limited to this, and another position may also be set as a second position if it is a position that can obtain a spatial resolution not less than that at the position $x_1$ in the depth of focus. In other words, the virtual imaging plane 203 is set to the position (the second position) in a range of the depth of focus of the imaging optical system 101 with reference to the position $x_1$ (the first position) so that the maximum value of the apparent pixel pitch that is formed by reconstructing the input image is decreased. If the spatial resolution that is obtained at the position $x_1$ is the highest or sufficiently high, the position $x_2$ may be equal to the position $x_1$ ($x_2 = x_1$). On the other hand, when a value exceeds the upper limit of Expression (4)

described above, the spread of the point image with respect to the specified focus position of the refocus image at the second position exceeds ε. Therefore, even when the resolution is improved by the super-resolution from subpixel shift, the sharpness is deteriorated since the object for which the specified focusing is performed is blurred.

As the position of the virtual imaging plane 203 is close to $s_2$, the spread of the point image at the focus position of the refocus image is reduced. In other words, it is preferred that the position $x_2$ be set between the position $s_2$ and the position $x_1$. Therefore, it is preferred that the following Expression (5) be met.

$$0 \leq \left| \frac{s_2 - x_2}{s_2 - x_1} \right| \leq 1 \qquad (5)$$

When a value exceeds the upper limit of Expression (5), an absolute value of a distance at the position $x_1$ becomes smaller than the absolute value at the position $x_2$ with reference to the position $s_2$. Therefore, the spread of the point image at the focus position in the refocus image at the position $x_2$ is wider than the case of the position $x_1$.

Next, in Step S005, the virtual imaging plane 203 is set to the second focus position $x_2$ determined in Step S004 so as to generate the output image. In other words, the output image is generated in a state where the virtual imaging plane 203 is set to the second position. In the present embodiment, using the method of generating the refocus image described above for the input image obtained by the image pickup element 103, the refocus image that has high resolution and that is focused on the focus position specified by the user is generated. If necessary, at the same time as the refocus processing, a reconstruction processing that changes the point of view or the depth of field may also be performed. In addition, image estimation such as MAP (Maximum a posteriori) estimation is used as well in the reconstruction processing of the image so that further high resolution can be obtained.

In FIG. 6, the imaging optical system 101 is a zoom lens. The imaging optical system 101 includes a first lens unit L1 that has a positive refractive power, a second lens unit L2 that has a negative refractive power, and a third lens unit L3 that has a positive refractive power. The imaging optical system 101 further includes a fourth lens unit L4 that has a positive refractive power, a fifth lens unit L5 that has a negative refractive power, and a sixth lens unit L6 that has a positive refractive power. The imaging optical system 101 that is configured by including the first to sixth lens units L1 to L6 as above change an interval of each lens unit during varying magnification and perform an in-focus process using the second lens unit L2.

It is preferred that a surface at the image side of the small lens that constitutes the lens array 102 have a convex shape. As a result, astigmatism of the lens array 102 is reduced, and the image that is obtained on the image pickup element 103 is sharpened. On the other hand, when a surface at the image side of the small lens does not have the convex shape, the astigmatism increases and a peripheral portion of the image formed by each small lens is blurred. Using the blurred portion of this image to perform the reconstruction processing, the reconstructed image with sharpness cannot be formed. In is preferred that the surface at the object side of the small lens that constitutes the lens array 102 have a planar shape or convex shape. As a result, a radius of curvature of the small lens is gentled and aberrations are reduced, and therefore the image is sharpened.

According to the present embodiment, an image processing method that is capable of reducing dependency of a focus position for the resolution of a refocus image so as to obtain a high-resolution refocus image, and an image pickup apparatus that performs the image processing method can be provided.

Embodiment 2

Next, Embodiment 2 of the present invention will be described. A basic configuration of an image pickup apparatus in the present embodiment is the same as the image pickup apparatus of Embodiment 1 described with reference to FIG. 5, and therefore descriptions thereof will be omitted.

Figure 2:
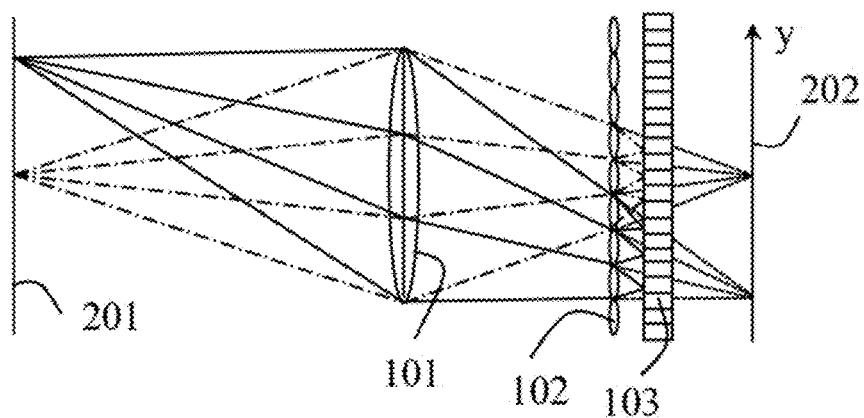
FIG. 2 is a schematic configuration diagram of an image pickup optical system in each of Embodiments 2 to 5.
Figure 11:
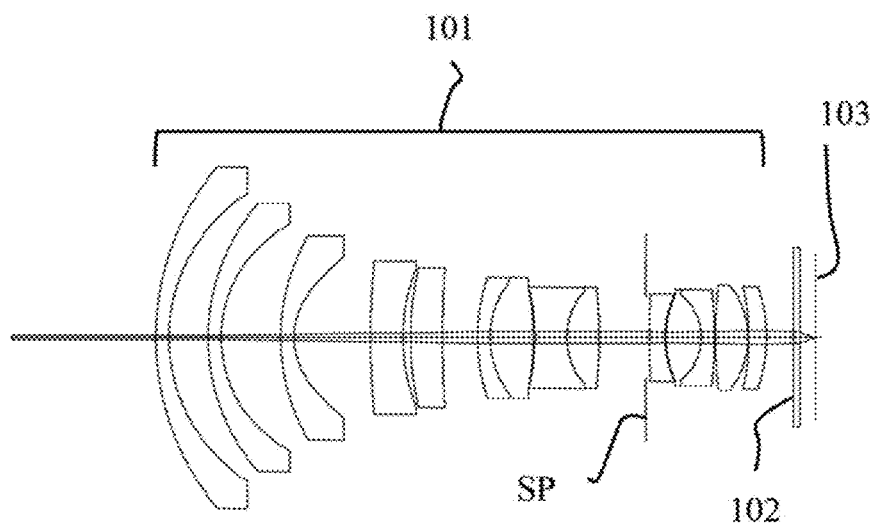
FIG. 11 is a cross-sectional diagram of the image pickup optical system in Embodiment 2.

Subsequently, referring to FIGS. 2 and 11, a configuration of an image pickup optical system in the present embodiment will be described. FIG. 2 is a schematic configuration diagram of the image pickup optical system. FIG. 11 is a cross-sectional diagram of the image pickup optical system. The lens array 102 is disposed at the object side relative to an image side conjugate plane 202 of the imaging optical system 101 with respect to the object plane 201. The lens array 102 is disposed so that the image side conjugate plane 202 of the imaging optical system 101 with respect to the object plane 201 and the image pickup element 103 are conjugate to each other (so that they have a conjugate relation). A ray from the object plane 201 passes through the imaging optical system 101 and the lens array 102 before entering pixels different from each other of the image pickup element 103 in accordance with a position and an angle of the ray on the object plane 201, and thus the light field is obtained. The ray from the same position on the object plane 201 passes through pupil regions different from each other of the imaging optical system 101 in accordance with the angle with respect to the object plane 201. As a result, the image pickup element 103 obtains an image that is configured by a plurality of arrayed small images which have different shot points of view and shot ranges.

The image pickup optical system illustrated in FIG. 2 has a deteriorated spatial resolution compared to the image pickup optical system which obtains only the two-dimensional light intensity distribution. This is because an image that is formed by the imaging optical system 101 is viewed as an imaginary object by the lens array 102 so that it is reduced to be imaged on the image pickup element 103. The reduction magnification is $|\sigma_2/\sigma_1|$ times. Symbol $\sigma_1$ denotes a distance between the image side conjugate plane 202 and the object side principal plane of the lens array 102, and symbol $\sigma_2$ denotes a distance between the image side principal plane of the lens array 102 and the image pickup element 103. Therefore, the image pickup optical system illustrated in FIG. 2 has two-dimensional spatial resolution improved by $(\sigma_2/\sigma_1)^2$ times with respect to the image pickup optical system which obtains only the two-dimensional light intensity distribution.

Figure 3:
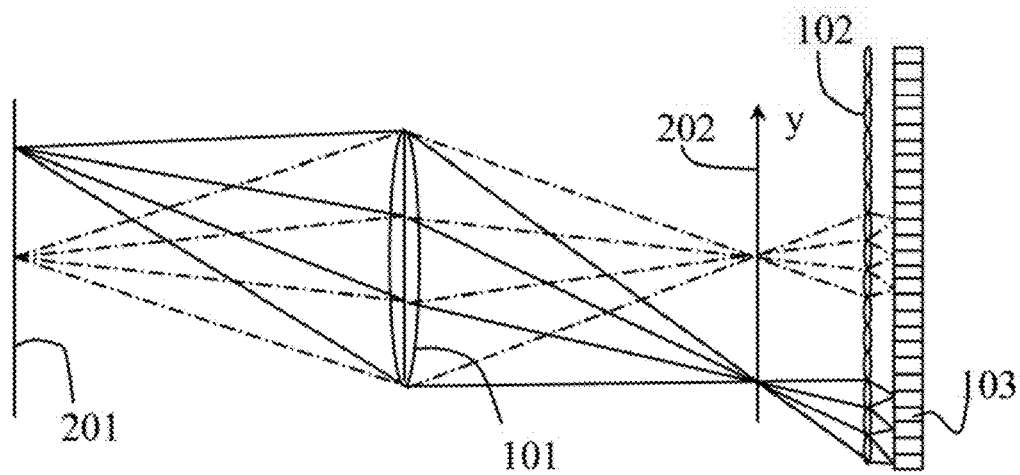
FIG. 3 is a schematic configuration diagram of an image pickup optical system in each of Embodiments 2 to 5.

This characteristic is similar to that of the image pickup optical system illustrated in FIG. 3. A configuration of the image pickup optical system in FIG. 3 is the same as the configuration of the image pickup optical system illustrated in FIG. 2, except for the lens array 102 disposed at the image side relative to the image side conjugate plane 202. The difference from the configuration of FIG. 2 is that the image formed by the imaging optical system 101 is viewed by the lens array 102 as a real object so as to be reimaged on the image pickup element 103. However, in any of the configurations of the image pickup optical systems illustrated in FIGS. 2 and 3, the image formed by the imaging optical system 101 is viewed by the lens array 102 as an object so that the image is imaged on the image pickup element 103, and therefore they are essentially the same. Accordingly, the following discussions are also applied to the configuration of FIG. 3.

Figure 12A:
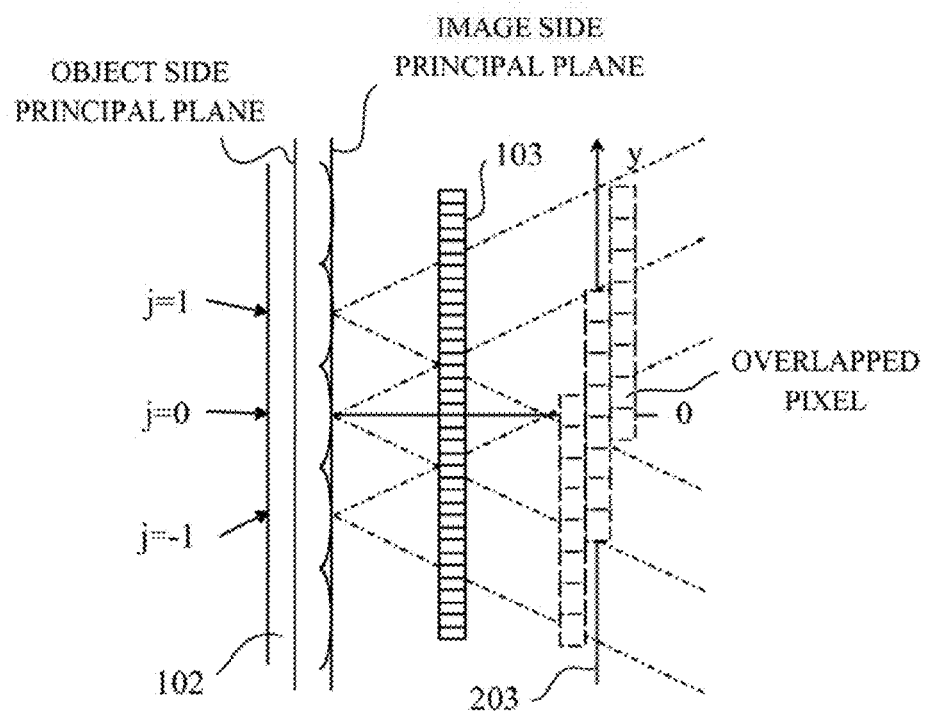
FIGS. 12A and 12B are diagrams of describing refocus image generation in each of Embodiments 2 to 5.
Figure 12B:
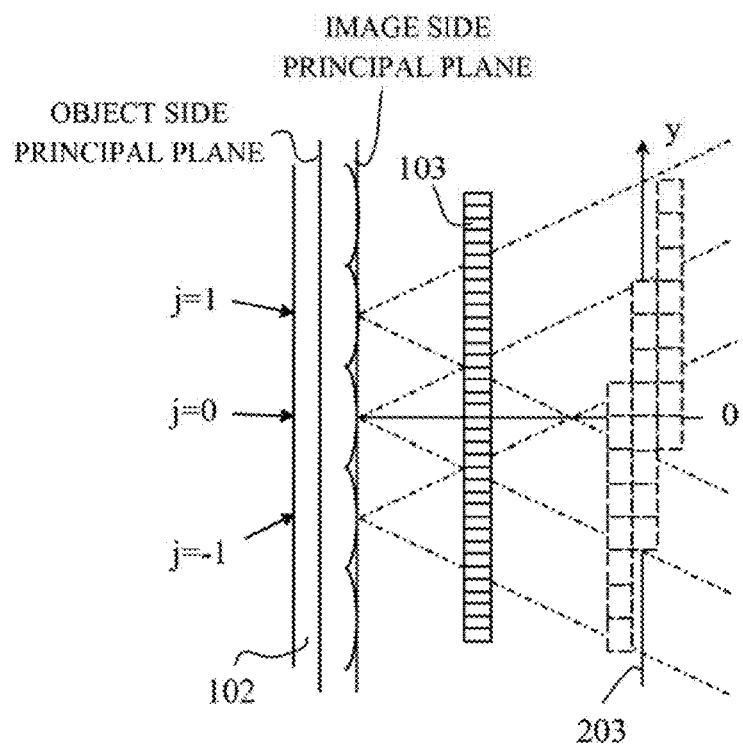

Next, referring to FIGS. 12A and 12B, a method of generating the refocus image in the present embodiment will be described. FIGS. 12A and 12B are detailed diagrams of parts of the lens array 102 and the image pickup element 103 in the configuration of the image pickup optical system illustrated in FIG. 2. In the present embodiment, the lens array 102 is configured by a small lens that has a surface at the object side having a planar shape and that has a surface at the image side having a convex shape. However, similarly to Embodiment 1, the shape of the lens array 102 is not limited to this.

Dashed-dotted lines in FIGS. 12A and 12B indicate an angle of view of each small lens. A pixel value that is obtained by the image pickup element 103 is projected and combined on the virtual imaging plane 203 via the small lens corresponding to the pixel so that the refocus image that is focused on the virtual imaging plane 203 can be generated. For example, in order to generate the image that is focused on the object plane 201 in FIG. 2, the virtual imaging plane 203 may be set on the image side conjugate plane 202. In FIGS. 12A and 12B, pixels that are projected during generating the refocus image is represented by dashed lines, and for easy understanding they are depicted by being shifted without being overlapped with each other. The refocus image may also be generated by using a method of combining each pixel while performing a parallel translation of each pixel so that pixels are overlapped with each other similarly to the case of the generating method by projecting the pixels described above. In this case, when regions of the lens array 102 through which the light beams entering the pixels pass are the same, amounts of the parallel translation of the pixels are the same. As described above, the operation of the pixels during generating the refocus image in the present embodiment is determined in accordance with the region of the lens array 102 through which the light beam entering the pixel passes.

Figure 13:
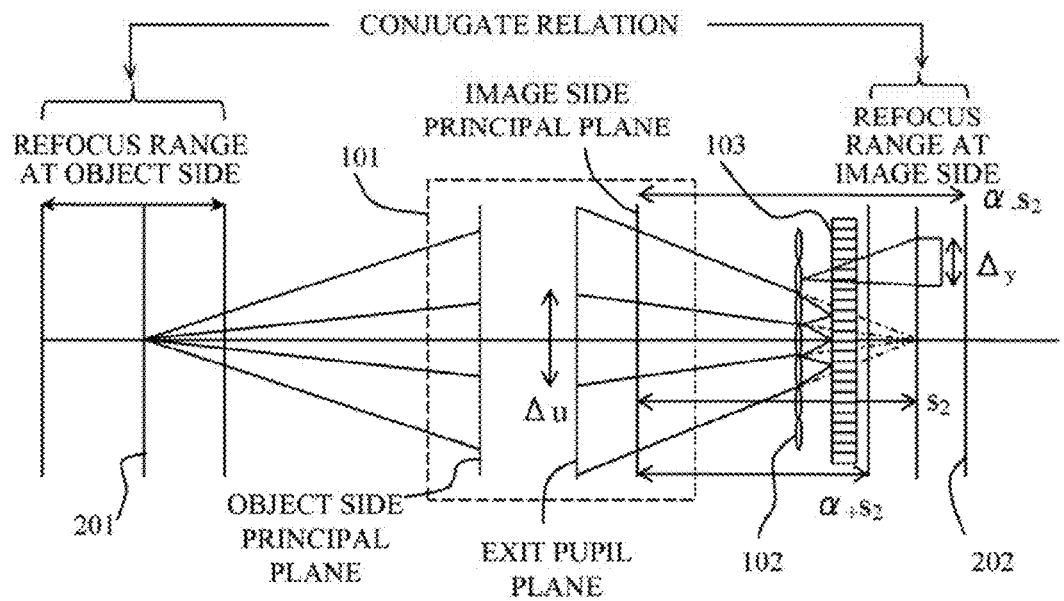
FIG. 13 is a diagram of describing a refocus range in each of Embodiments 2 to 5.

Subsequently, a range in which the refocus can be performed will be described. The refocus range of the image pickup optical system in the present embodiment is also represented by Expression (1), similarly to Embodiment 1. The relationship is as illustrated in FIG. 13. FIG. 13 is a diagram of describing the refocus range in the present embodiment. In the image pickup optical system in the present embodiment, $\Delta y = \Delta |\sigma_1/\sigma_2|$ and $\Delta u = P/(NF)$ are met and $\Delta \ll P$ is also met, Expression (1) is rewritten by the following Expression (6).

$$\alpha_+ s_2 = s_2 \mp NF\Delta y = s_2 \mp NF\Delta |\sigma_1/\sigma_2| \qquad (6)$$

In Expression (6), symbol $\Delta$ is a pixel pitch of the image pickup element 103. Similarly to Embodiment 1, when a value exceeds the range of Expression (6), a correct refocus image cannot be generated.

Next, the improvement of the spatial resolution by the super-resolution from subpixel shift will be described. As illustrated in FIG. 12A, the pixels which are projected on the virtual imaging plane 203 are overlapped with each other. The number of the overlapped pixels is referred to as an overlap number. As illustrated in FIG. 12A, when the projected pixels are shifted each other, they can be combined so as to decrease the apparent pixel pitch. On the other hand, as illustrated in FIG. 12B, when the shift of the projected pixels is an integral multiple of the pixel, the effect of the super-resolution from subpixel shift cannot be obtained. When a ratio of the shift of the pixels corresponds to the overlap number of the pixels, the highest resolution can be obtained by the super-resolution from subpixel shift. Specifically, since the overlap number of the pixels is 3 in the case of FIG. 12A, the highest resolution can be obtained when the ratio of the pixel shift is ⅓ or ⅔. The relationship between the ratio of the pixel shift and the overlap number of the pixels will be described below in detail. As above, also in the present embodiment, the effect of the super-resolution from subpixel shift is changed in accordance with the virtual imaging plane 203. Therefore, as illustrated in FIG. 9, the resolution of the refocus image is changed in the refocus range.

Subsequently, the relationship between the virtual imaging plane 203 and the super-resolution from subpixel shift will be specifically described. First of all, a case in which the virtual imaging plane 203 coincides with the image side conjugate plane 202 of the imaging optical system 101 with respect to the object plane 201 is considered. The relationship between $\sigma_1$ and the ratio of the pixel shift is obtained as follows. A relative pixel shift amount g of each of the pixels projected via an adjacent small lens is represented by a ratio $\Delta_{LA}\sigma_2/|\Delta\sigma_2|$ that is obtained by dividing the pitch $\Delta_{LA}$ of the lens array 102 by the pixel pitch projected on the image side conjugate plane 202.

Figure 14:
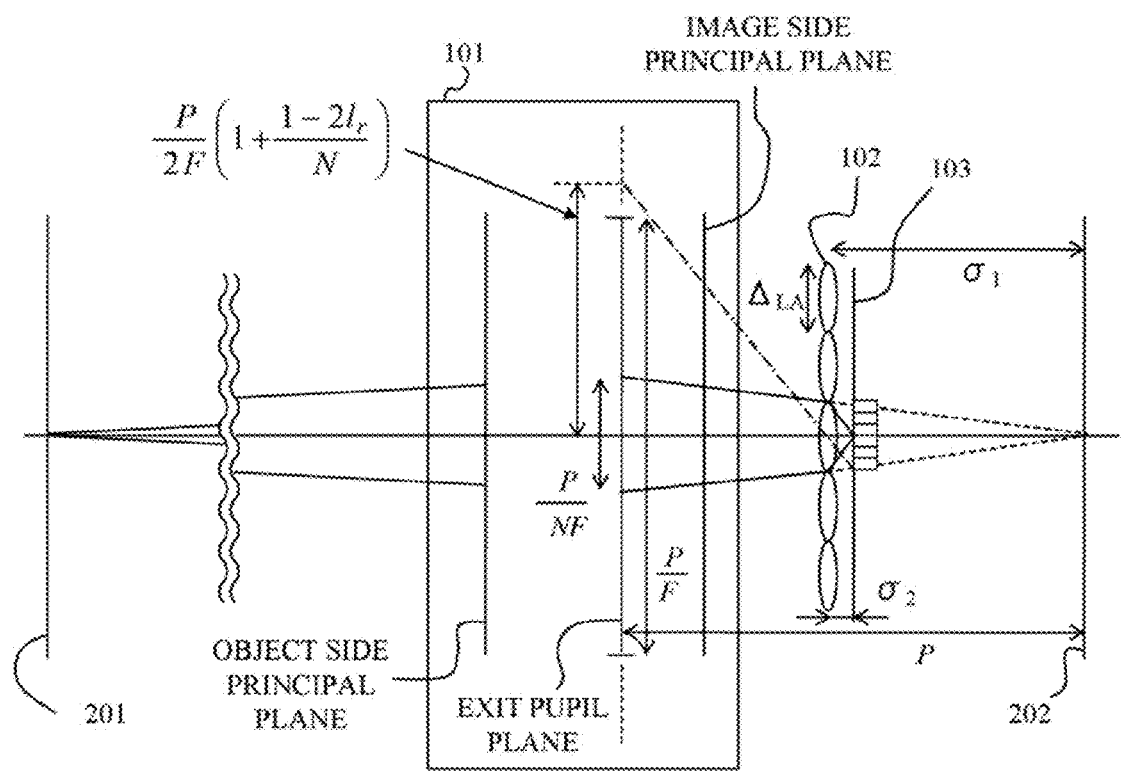
FIG. 14 is a diagram of describing an image pickup optical system in each of Embodiments 2 to 5.

In order to know a behavior of the pixel shift amount g for the arrangement of the lens array 102, referring to FIG. 14, a condition that $\sigma_1$ and $\sigma_2$ need to meet will be described. FIG. 14 is a diagram of describing the image pickup optical system in the present embodiment, which illustrates a detailed configuration of FIG. 2. Symbol F in FIG. 14 denotes an F-number of the imaging optical system 101, and symbol P denotes a distance between an exit pupil of the imaging optical system 101 and the image side conjugate plane 202. A sampling pitch on an exit pupil plane (angle information) of the imaging optical system 101 that is obtained by the image pickup element 103 is $\Delta u = P/(NF)$. Referring to FIG. 14, it is understood that the relationship represented by Expression (7) is met between $\Delta_{LA}$ and $\sigma_1$.

$$\Delta_{LA} = \frac{|\sigma_1|}{NF} \qquad (7)$$

A dashed-dotted line in FIG. 14 is a straight line that connects a center of the small lens of the lens array 102 with an edge of the pixel set corresponding to the small lens. A distance between an intersection on the exit pupil plane and the pupil center is given by the following Expression (8).

$$\frac{P}{2F}\left(1 + \frac{1 - 2l_r}{N}\right) \qquad (8)$$

Expression (8), symbol $l_r$ denotes a parameter that indicates a dead zone on the image pickup element 103 and a degree of crosstalk.

Subsequently, referring to FIG. 15, the dead zone and the crosstalk will be described. FIGS. 15A and 15B are diagrams of describing an image that is formed on the image pickup element 103. FIG. 15A is a diagram of illustrating a state of the image on the image pickup element 103 when $l_r$ is a negative value. White parts are regions which the ray enters, and a shaded part is referred to as a dead zone, which is a region that the ray does not enter. As $l_r$ is decreased, the dead zone is spread. This means that pixels that do not obtain information are increased, and therefore it is preferred that the dead zone be reduced as much as possible.

Figures 15A, 15B:
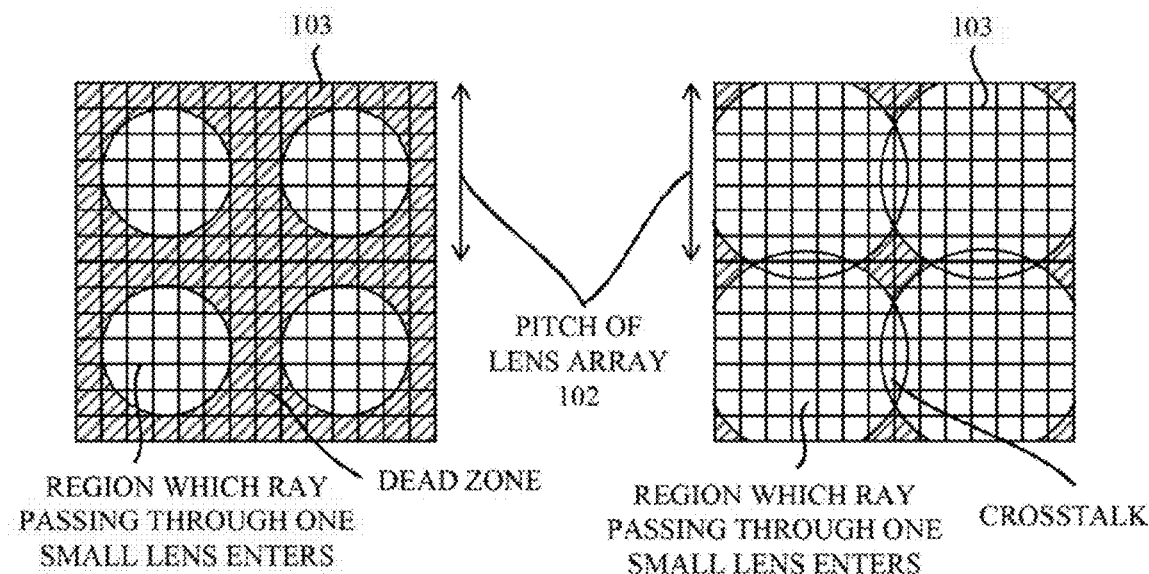
FIGS. 15A and 15B are diagrams of describing an image that is formed on an image pickup element in each of Embodiments 2 to 5.

On the other hand, FIG. 15B is a diagram of illustrating a state of the image on the image pickup element 103 when $l_r$ is a positive value. In FIG. 15B, the images formed via different small lenses are overlapped with each other. In this overlapped region, rays that have different positions and angles on the object plane 201 enter the same pixel, and this phenomenon is called a crosstalk. As $l_r$ is increased, the region of the crosstalk is spread. Since the pixel in which the crosstalk is generated cannot obtain the light field, a correct image cannot be obtained when using this pixel for the reconstruction. When the pixel in which the crosstalk is generated is not used for the image reconstruction, unusable pixels are increased as the region of the crosstalk is spread. Therefore, it is preferred that the region of the crosstalk be as small as possible. When $l_r$ is zero, the generations of the dead zone and the crosstalk are reduced to the minimum. However, in a real system, due to a shift of the best focus position by the aberration, vignetting of the imaging optical system 101, peripheral brightness falloff, or the like, there is a case of reducing the generation of the dead zone or the crosstalk even when $l_r$ is slightly shifted from zero.

Referring to FIG. 14 and Expression (8), the following Expression (9) is met.

$$\frac{N+1-2l_r}{N}\frac{P\sigma_2}{2F(P-\sigma_1)} = \frac{\Delta_{LA}}{2} \quad (9)$$

Therefore, the relative pixel shift amount g of the adjacent small lenses is given by the following Expression (10) using Expressions (7) and (9).

$$g = \frac{\Delta_{LA}}{\Delta\left|\frac{\sigma_1}{\sigma_2}\right|} = \frac{1}{N(N+1-2l_r)F}\left|\frac{\sigma_1}{\Delta}\right|\left(1-\frac{\sigma_1}{P}\right) \quad (10)$$

As a result, the expression that represents the behavior or the pixel shift amount g for the distance $\sigma_1$ is obtained. Referring to Expression (10), it is understood that the pixel shift amount g is described by a quadratic function of the distance $\sigma_1$. In the embodiment, since the shift of the integral multiple of the pixels is meaningless as illustrated in FIG. 12B, an integer part in Expression (10) does not need to be considered. Accordingly, a ratio $\delta$ of the pixel shift is represented as the following Expression (11)

$$\delta = \mathrm{mod}\left(\left|\frac{\Delta_{LA}\sigma_2}{\Delta\sigma_1}\right|, 1\right) \quad (11)$$

In Expression (11), symbol $\omega = \mathrm{mod}(\chi, \psi)$ denotes that $\omega$ is equal to a remainder obtained by dividing $\chi$ by $\psi$.

Expression (11) indicates a ratio of the pixel shift when the virtual imaging plane 203 coincides with the image side conjugate plane 202 of the imaging optical system 101 with respect to the object plane 201. When an image that is refocused on an arbitrary virtual imaging plane 203 is generated, the position of the virtual imaging plane 203 on which the image is projected may be changed. Therefore, on an arbitrary focus plane, Expressions (10) and (11) are represented as the following Expressions (12) and (13), respectively.

$$g = \frac{\Delta_{LA}\sigma_2}{\Delta|\tau|} \quad (12)$$

$$\delta = \mathrm{mod}\left(\left|\frac{\Delta_{LA}\sigma_2}{\Delta\sigma_1}\right|, 1\right) \quad (13)$$

Figure 16:
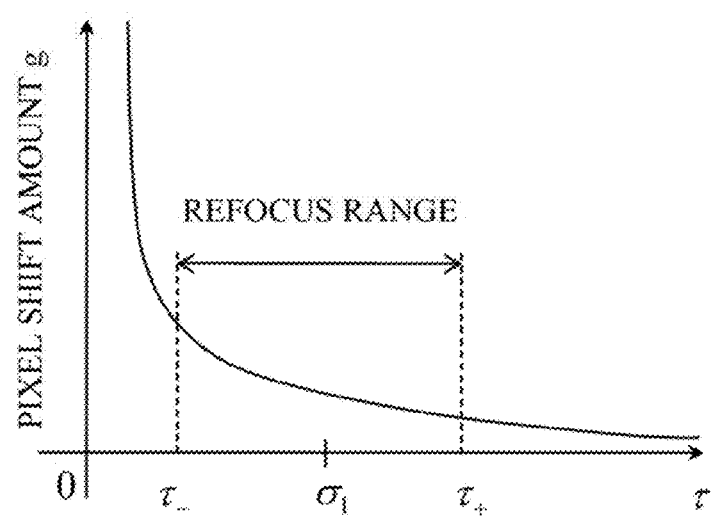
FIG. 16 is a diagram of describing a relationship between a distance τ and a pixel shift amount g in each of Embodiments 2 to 5.
Figure 17:
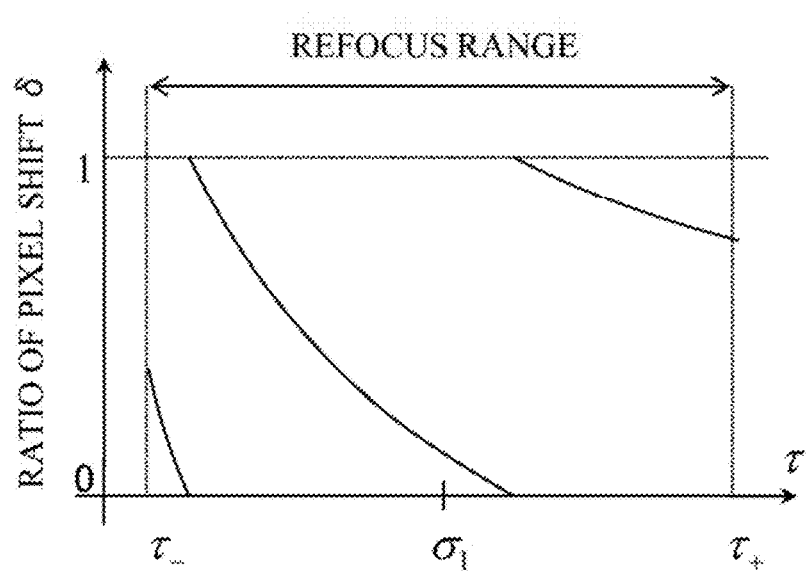
FIG. 17 is a diagram of describing a relationship between the distance τ and a ratio 5 of a pixel shift in each of Embodiments 2 to 5.

In Expression (12), symbol $\tau$ is a distance from the object side principal plane of the lens array 102 to the virtual imaging plane 203. Referring to Expression (12), it is understood that the distance $\tau$ and the pixel shift amount g have a relationship of an inverse proportion. FIG. 16 illustrates the relationship between the distance $\tau$ and the pixel shift amount g, and FIG. 17 illustrates the distance $\tau$ and the ratio $\delta$ of the pixel shift. Symbols $\tau_+$ and $\tau_-$ in FIGS. 16 and 17 are respectively an upper limit and a lower limit of the range in which the refocus can be performed that are determined based on Expression (1), which are represented by the following Expression (14).

$$\tau_\pm = \sigma_1 \pm NF\Delta|\sigma_1/\sigma_2| \quad (14)$$

In Expression (14), $\Delta u = P/(NF)$ is met and $\Delta \ll P$ is also met. As above, the relationship between the virtual imaging plane 203 and the pixel shift amount is obtained.

Figure 18:
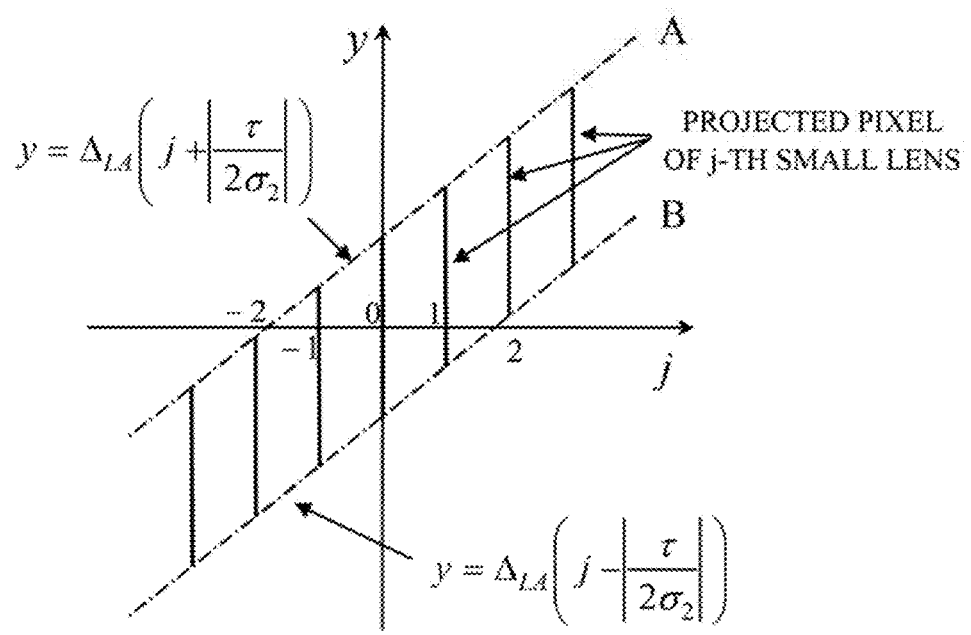
FIG. 18 is a diagram of describing the overlap number of pixels in each of Embodiments 2 to 5.

Next, the spatial resolution including the super-resolution from subpixel shift in the refocus range will be described. First of all, the overlap number of the pixels is estimated. FIG. 18 is a diagram of describing the overlap number of the pixels, which is a graph that has a horizontal axis indicating the number j of the small lens illustrated in FIG. 12A and that has a vertical axis indicating a coordinate y on the virtual imaging plane 203. In the embodiment, j=0 may be an arbitrary small lens of the lens array 102. Each of straight lines parallel to a y-axis in FIG. 18 represents a coordinate that is obtained when the pixel group corresponding to the j-th small lens is projected on the virtual imaging plane 203. A dashed-dotted line A connects the upper limits of these straight lines, and a dashed-dotted line B connects the lower limits of the straight lines. The dashed-dotted line A is given by $y=\Delta_{LA}\{j+|\tau/(2\sigma_2)|\}$, and the dashed-dotted line B is given by $y=\Delta_{LA}\{j-|\tau/(2\sigma_2)|\}$. The overlap number of the pixels corresponds to an interval between the dashed-dotted lines A and B in a j direction. The overlap number of the pixels that correspond to j=0 is the minimum for pixels near y=0, and the overlap number can be estimated at around $|\tau/\sigma_2|$.

Subsequently, the spatial resolution including the super-resolution from subpixel shift is obtained. Ideally, if m pixels which are shifted by 1/m are overlapped with each other, the resolution is improved to m times. In the embodiment, m denotes a positive integer. In a real system, however, due to the influence of a noise or aberration of the imaging optical system, an amount of improving the resolution caused by the super-resolution from subpixel shift is smaller than that in an ideal system. For easy descriptions, however, the improvement of the resolution in the ideal system will be described.

The resolution is the highest when the overlap number of the pixels and the ratio $\delta$ of the pixel shift represented by Expression (13) correspond to each other. For example, when the overlap number of the pixels is 8 and the ratio $\delta$ of the pixel shift is 0.45, the pixel shifts of the eight pixels are 0, 0.45, 0.90, 0.35, 0.80, 0.25, 0.70, and 0.15, respectively. In this case, the maximum value of the apparent pixel pitch that determines the resolution is 0.70−0.45=0.25. Next, a case in which the overlap number is the same and the ratio $\delta$ of the pixel shift is ⅜ will be considered. In this case, the pixel shifts of the eight pixels are 0, ⅜, ⅝, ⅛, ⁴⁄₈, ⅞, ⅖, and ⅝, respectively. The maximum value of the apparent pixel pitch is ⅛, which equals to the inverse of the overlap number of the pixels. Accordingly, the maximum effect of the super-resolution from subpixel shift is obtained. The same is true for any one of cases in which $\delta$ is ⅛, ⅝, and ⅞.

However, when $\delta$ is any one of ⅖, ⅘, and ⅚, the effect of the super-resolution from subpixel shift is deteriorated. As an example, a case in which $\delta$ is ⅖ is considered. In this case, the pixel shifts of the eight overlapped pixels are 0, ⅖, ⅘, ⅚, 0, $\frac{2}{8}$, $\frac{4}{8}$, and $\frac{6}{8}$, respectively, and the maximum value of the apparent pixel pitch is $\frac{2}{8}=\frac{1}{4}$ since the pixels are overlapped with each other. Accordingly, the effect of the super-resolution from subpixel shift is half of the case in which δ is any one of $\frac{1}{8}$, $\frac{3}{8}$, $\frac{5}{8}$, and $\frac{7}{8}$. Thus, when δ is equal to $m_0/M_0$, the maximum effect of the super-resolution from subpixel shift is obtained. Symbol $M_0$ denotes the overlap number of pixels, and symbol $m_0$ denotes an integer that is smaller than $M_0$ and that has the greatest common divisor of 1 for $M_0$. As described above, $M_0$ can be estimated at around $|\tau/\sigma_2|$, and the effect of the super-resolution from subpixel shift is improved as δ is close to $m_0/M_0$.

Figure 19:
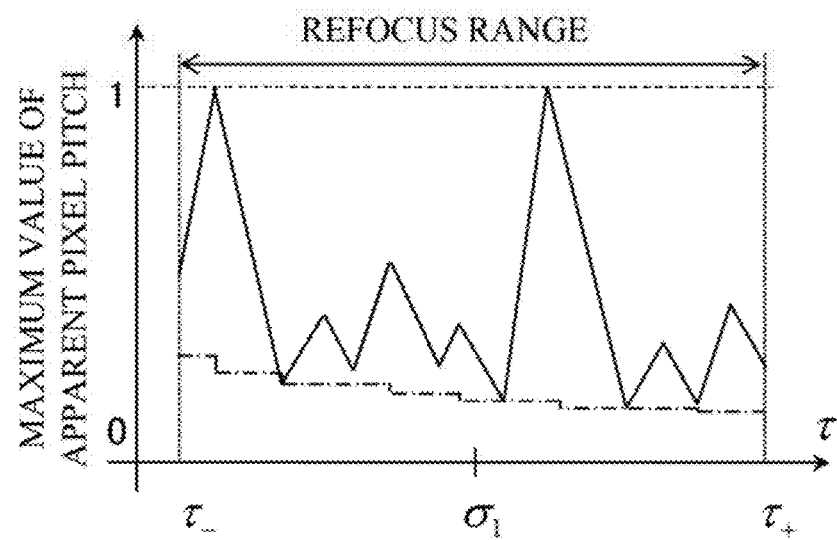
FIG. 19 is a schematic diagram of illustrating a relationship between a maximum value of an apparent pixel pitch for the distance τ and an inverse of the overlap number of the pixels in each of Embodiments 2 to 5.

FIG. 19 is a schematic diagram of illustrating the relationship between the maximum value of the apparent pixel pitch for the distance τ and the inverse of the overlap number of the pixels. As the distance τ is changed so that the maximum value of the apparent pixel pitch indicated by a solid line and the inverse of the overlap number of the pixel are close to each other, the effect of the super-resolution from subpixel shift is improved and also the resolution of the reconstructed image is improved. On the other hand, in the distance τ at which the maximum value of the apparent pixel pitch and the inverse of the overlap number of the pixels are away from each other, the improved effect of the super-resolution from subpixel shift cannot be obtained. As a result, the spatial resolution for the distance τ changes as indicated by the dashed line in FIG. 9. Therefore, considering the depth of focus similarly to Embodiment 1, a high-resolution refocus image in which the dependency of the virtual imaging plane 203 is reduced is obtained.

An image processing method that generates the output image based on the input image in the present embodiment is represented by the flowchart of FIG. 10 that is referred to in Embodiment 1, and descriptions of the parts similar to those of Embodiment 1 will be omitted. In Step S001, the image pickup element 103 obtains an image that is configured by arraying a plurality of small images that have different shot points of view and shot ranges. The reconstruction method selected in Step S002 is for example a method of generating the refocus image described in the present embodiment. The conditional expressions in Embodiment 1 described in Steps S003 and S004 are also met in the present embodiment. In Step S005, the refocus image which is focused on the position $x_2$ determined in Step S004 is generated as an output image. As a generating method in this case, the method described above or the like is used. According to the above configuration, an image processing method that is capable of reducing the dependency of a focus position for resolution of a refocus image so as to obtain a high-resolution refocus image and an image pickup apparatus that performs the image processing method can be provided.

The crosstalk or the dead zone that is formed on the image pickup element 103 will be considered. As described above, when the crosstalk or the dead zone is generated, the efficiency of obtaining the light field is deteriorated. The effect of the high resolution caused by the super-resolution from subpixel shift is improved as more light fields (parallax information) are obtained. In order to obtain more light fields, it is preferred that the crosstalk and the dead zone be reduced as much as possible. Therefore, $l_r$ in Expression (9) may be near zero. Accordingly, deforming Expression (9), Conditional Expression (15) that efficiently obtains the light field is introduced.

$$-1.0 \leq \left|\frac{1}{\sigma_2}\right| \left[\left(1 - \frac{\sigma_1}{P}\right) - \frac{1}{F_0 \Delta_{LA}}\right] \leq 3.0 \quad (15)$$

In Expression (15), symbol $F_0$ denotes an open F-value of the imaging optical system 101. F is set to $F_0$ because more light fields can be obtained as the diameter of the opening of the imaging optical system 101 is large. When a value exceeds the upper limit of Expression (15), the dead zone is increased on the image pickup element 103 and therefore an amount of the light field that can be obtained is decreased. On the other hand, when a value is below the lower limit of Expression (15), the crosstalk is increased on the image pickup element 103 and similarly the efficiency of obtaining the light field is decreased.

Preferably, the light field can be obtained more efficiently if the range of Expression (15) is set to a range that is represented by the following Expression (15a).

$$-0.6 \leq |\sigma_1| \left[\frac{1}{\sigma_2}\left(1 - \frac{\sigma_1}{P}\right) - \frac{1}{F_0 \Delta_{LA}}\right] \leq 2.6 \quad (15a)$$

More preferably, the light field can be obtained with extremely high efficiency if the range of Expression (15) is set to a range that is represented by the following Expression (15b).

$$-0.0 \leq |\sigma_1| \left[\frac{1}{\sigma_2}\left(1 - \frac{\sigma_1}{P}\right) - \frac{1}{F_0 \Delta_{LA}}\right] \leq 2.0 \quad (15b)$$

The configuration of the image pickup optical system of FIG. 2 in the present embodiment is different from the configuration of FIG. 1, and the arrangement of the lens array 102 has a degree of freedom. When the position of the lens array 102 is determined, a focal length of the small lens is determined so that the object plane 201 and the image side conjugate plane 202 are conjugate to each other. Therefore, when the image processing method of the present embodiment is performed, a better position of the lens array 102 is considered. The above discussion in the present embodiment can be applied to any one of the configurations of FIGS. 2 and 3. As is clear in comparison with FIG. 3, FIG. 2 has an advantage in that a total length of the image pickup apparatus can be reduced. Therefore, hereinafter, the discussion is focused on the configuration of FIG. 2. In the configuration of FIG. 2, $\sigma_1 \geq 0$ is met. In order to further reduce the dependency of the focus position with respect to the resolution of the refocus image so as to generate a higher resolution image, the local minimum of the resolution that is indicated by the solid line in FIG. 9 may be set to be large. The spatial resolution is the local minimum at the focus position on condition that the ratio of the pixel shift is zero, and the distance τ in this case is referred to as a distance $\tau_0$. The distance $\tau_0$ meets the following Expression (16).

$$\frac{\Delta_{LA}\sigma_2}{\Delta\tau_0} = k \quad (16)$$

In Expression (16), symbol k is an integer. Next, considering the focus position at which the spatial resolution which is closest to the distance $\tau_0$ has the local maximum value, the distance is referred to as $\tau_0+\rho$. The pixel shift amount at the distance $\tau_0+\rho$ is represented as the following Expression (17).

$$\frac{\Delta_{LA}\sigma_2}{\Delta\tau_0+\rho} = k - \frac{\Delta_{LA}\sigma_2\rho}{\Delta\tau_0(\tau_0+\rho)} \tag{17}$$

Therefore, the ratio of the pixel shift at the distance $\tau_0+\rho$ is indicated by the second term at the right side in Expression (17).

Since the overlap number of the pixels at the distance $\tau_0+\rho$ is, as described above, estimated at $(\tau_0+\rho)/\sigma_2$, $\rho$ meets the following Expression (18).

$$\left.\begin{array}{l}-\dfrac{\Delta_{LA}\sigma_2\rho}{\Delta\tau_0(\tau_0+\rho)} = \dfrac{\sigma_2}{\tau_0+\rho}(\rho<0)\\ \dfrac{\Delta_{LA}\sigma_2\rho}{\Delta\tau_0(\tau_0+\rho)} = \dfrac{\sigma_2}{\tau_0+\rho}(\rho>0)\end{array}\right\} \tag{18}$$

Figure 20:
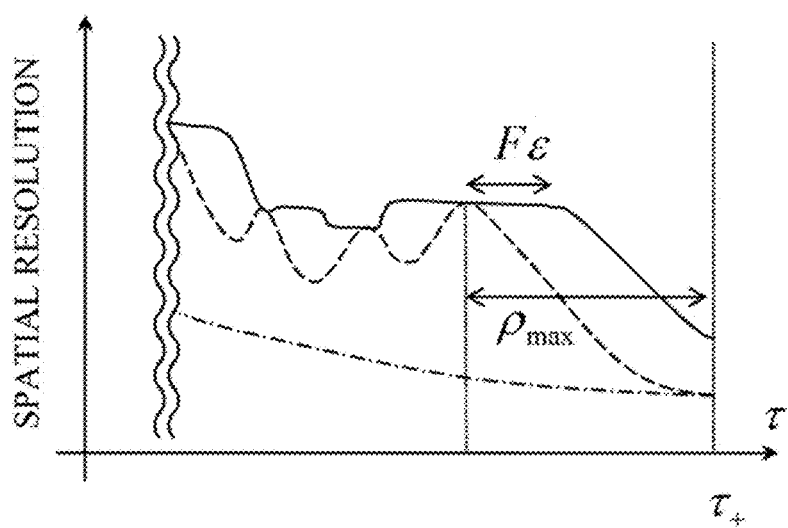
FIG. 20 is a diagram of describing a maximum value of intervals of focus positions where effects of super-resolution from subpixel shift indicate a minimum and a local maximum in each of Embodiments 2 to 5.

Referring to Expression (18), it is estimated that $\rho=\tau_0\Delta/\Delta_{LA}$ is met when $\rho$ is positive, and $\rho=-\tau_0\Delta/\Delta_{LA}$ is met when $\rho$ is negative. As the value which is obtained by dividing $\rho$ by $F\epsilon$ is small, the minimum value of the spatial resolution ratio can be increased. Since $\rho$ is proportional to $\tau_0$, $\rho$ indicates the maximum value $\rho_{max}$ in the refocus range when $\tau_0=\tau_+$ is met as illustrated in FIG. 20. A dashed line in FIG. 20 indicates a spatial resolution of the refocus image when considering the super-resolution from subpixel shift, and a dashed-dotted line indicates a spatial resolution of a case where the super-resolution from subpixel shift is not considered. A solid line in FIG. 20 indicates the effect of the super-resolution from sub-pixel shift and a spatial resolution considering the influence of the depth of focus. When a value that is obtained by dividing $\rho_{max}$ by $F\epsilon$ is reduced, a higher resolution refocus image which is focused on a specified position can be generated.

When the local maximum value and the local minimum value of adjacent resolutions are connected by a straight line so as to be approximately considered, the difference between both values can be reduced by around 30% if $\rho_{max}/F\epsilon$ is not more than around 3. As a result, the dependency of the focus position for the resolution of the refocus image can be reduced so as to obtain the high resolution. Referring to Expressions (14) and (18) described above, the following Expression (19) is introduced.

$$\rho_{max} = \frac{\Delta}{\Delta_{LA}}(\sigma_1+NF\varepsilon) \leq 3F\varepsilon \tag{19}$$

In order that Expression (19) has a solution, N/m needs to be smaller than 3. Symbol N denotes a one-dimensional division number of the pupil plane of the imaging optical system 101, which is a value that is obtained by dividing the diameter of a paraxial exit pupil plane of the imaging optical system 101 by the sampling pitch of the pupil plane of the imaging optical system 101. Symbol n denotes a value that is obtained by dividing the pitch of the lens array 102 by the pixel pitch of the image pickup element 103.

As a result, for example a condition that decreases $\rho_{max}$ for the depth of focus is set as follows. Preferably, the value that is obtained by dividing the diameter of the paraxial exit pupil plane of the imaging optical system 101 by the sampling pitch of the pupil plane of the imaging optical system 101 is set to be smaller than three times of the value that is obtained by dividing the pitch of the lens array 102 by the pixel pitch of the image pickup element 103. More preferably, the value that is obtained by dividing the diameter of the paraxial exit pupil plane of the imaging optical system 101 by the sampling pitch of the pupil plane of the imaging optical system 101 is set to be smaller than the value that is obtained by dividing the pitch of the lens array 102 by the pixel pitch of the image pickup element 103. More preferably, the value that is obtained by dividing the diameter of the paraxial exit pupil plane of the imaging optical system 101 by the sampling pitch of the pupil plane of the imaging optical system 101 is set to be smaller than 30% of the value that is obtained by dividing the pitch of the lens array 102 by the pixel pitch of the image pickup element 103. According to such a configuration, the resolution of the refocus image can be further improved.

N/m described above is decreased as the lens array 102 is moved to be positioned at the object side relative to the image side conjugate plane 202 of the imaging optical system 101, and as a result, the dependency of the focus position for the resolution of the refocus image can be reduced. In this case, since the image pickup element 103 is also rather positioned at the object side, the size of whole of the optical system can be reduced. However, since the lens array 102 is positioned at the object side relative to the image side conjugate plane 202, the lens array 102 interferes with the imaging optical system 101 if the interval between them is widely spread. Therefore, the lens array 102 may be disposed so as to meet the following Conditional Expression (20).

$$0.05 < \frac{\sigma_1}{P} < 0.60 \tag{20}$$

As a result, a small-size image pickup optical system that obtains a high-resolution refocus image without depending on a focus position can be provided. When a value is below the lower limit of Expression (20), $\rho_{max}/F\epsilon$ is increased and therefore the high-resolution refocus image cannot be sufficiently obtained. On the other hand, when a value exceeds the upper limit of Expression (20), there may be a case in which the lens array 102 interferes with the imaging optical system 101.

Preferably, the range of Expression (20) described above is set to a range of the following Expression (20a) so that a higher resolution refocus image can be obtained.

$$0.08 < \frac{\sigma_1}{P} < 0.50 \tag{20a}$$

The upper limit of Expression (20) is changed to that of Expression (20a) so that the possibility that the lens array 102 interferes with the imaging optical system 101 can be reduced. More preferably, the range of Expression (20) described above is set to a range of the following Expression (20b) so as to avoid the interference of the lens array 102 with the imaging optical system 101 and obtain a sufficiently-high resolution refocus image.

$$0.12 < \frac{\sigma_1}{P} < 0.40 \tag{20b}$$

In the present embodiment, the imaging optical system 101 illustrated in FIG. 11 is a single focus lens, and the open F-value $F_0$ is $F_0=2.9$ and a distance P from the exit pupil to the image side conjugate plane 202 is P=63.4909 (mm). Therefore, the diameter of the paraxial exit pupil plane of the imaging optical system 101 is 21.8934 (mm). The pitch $\Delta_{LA}$ of the lens array 102 is $\Delta_{LA}$=2.4166 (mm), and the pixel pitch $\Delta$ of the image pickup element 103 is $\Delta$=0.0043 (mm). The lens array 102 is disposed so that the distance $\sigma_1$ is $\sigma_1$=35.0407 (mm) and the distance $\sigma_2$ is $\sigma_2$=2.1219 (mm). The sampling pitch of the imaging optical system 101 on the pupil plane in this case is 4.3787 (mm). Therefore, the value that is obtained by dividing the diameter of the paraxial exit pupil plane of the imaging optical system 101 by the sampling pitch of the pupil plane of the imaging optical system 101 is 0.0089 times of the value that is obtained by dividing the pitch of the lens array 102 by the pixel pitch of the image pickup element 103.

The value of Expression (15) is 2.40, and the value of Expression (20) is 0.552. Using a positive real number 1, the diameter $\epsilon$ of the permissible circle of confusion is referred to as $1\Delta$. The depth of focus in this case is $\pm 1F\Delta$. Although the depth of focus is changed in accordance with a required performance, in the embodiment a case of l=5 is described as an example. In the above configuration, the maximum value of the difference between the focus position where the effect of the super-resolution from subpixel shift is the minimum and the focus position where the effect is the local maximum is $\rho_{max}$=0.0629 (mm). On the other hand, since the depth of focus is 0.0624 (mm), the resolution at the focus position where the effect of the super-resolution from subpixel shift cannot be obtained can be substantially the same as that at the focus position where the effect is the local maximum. Furthermore, the generation of the dead zone on the image pickup element 103 is reduced so that more parallax information is obtained. According to such a configuration, the effect of the image processing method of the present embodiment is improved so that a high-resolution refocus image can be obtained and a small-size image pickup apparatus can be achieved.

Embodiment 3

Figure 21:
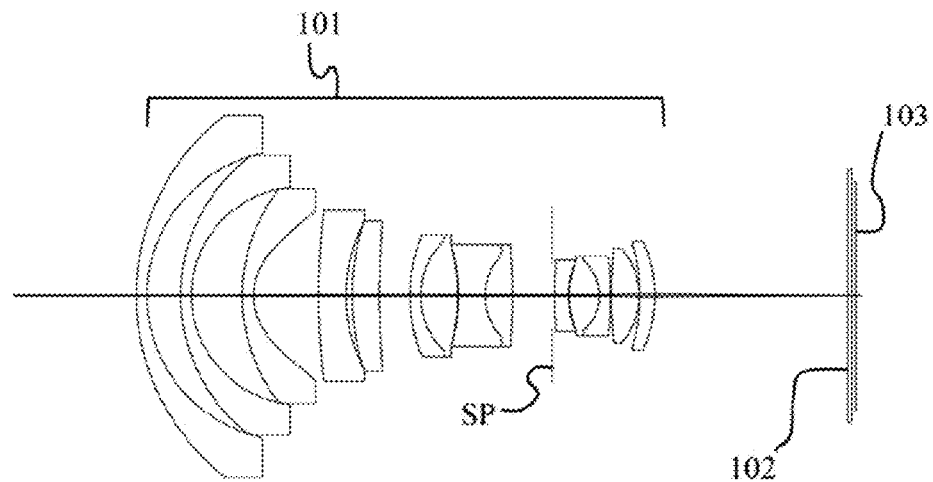
FIG. 21 is a cross-sectional diagram of the image pickup optical system in Embodiment 3.

Next, Embodiment 3 of the present invention will be described. The basic configuration of an image pickup apparatus in the present embodiment is the same as the image pickup apparatus of Embodiment 1 described with reference to FIG. 5, and therefore descriptions thereof will be omitted. An image pickup optical system in the present embodiment has a configuration illustrated in FIG. 2, and its cross section is illustrated in FIG. 21. In FIG. 21, the imaging optical system 101 is a single focus lens. Each of small lenses constituting the lens array 102 has a surface at the object side having a planar shape and a surface at the image side having a convex shape, and an image formed by the imaging optical system 101 is viewed as an imaginary object so as to be imaged on the image pickup element 103. An image processing method that generates an output image from an input image in the present embodiment is, similarly to Embodiment 2, indicated by the flowchart illustrated in FIG. 10. According to the above configuration, an image pickup apparatus that performs an image processing method capable of reducing the dependency of a focus position for resolution of a refocus image so that a high-resolution refocus image can be obtained is achieved.

In the present embodiment, the open F-value $F_0$ of the imaging optical system 101 is $F_0$=2.9 and a distance P from the exit pupil to the image side conjugate plane 202 is P=63.4909 (mm). Therefore, the diameter of the paraxial exit pupil plane of the imaging optical system 101 is 21.8934 (mm). The pitch $\Delta_{LA}$ of the lens array 102 is $\Delta_{LA}$=0.0512 (mm), and the pixel pitch $\Delta$ of the image pickup element 103 is $\Delta$=0.0064 (mm). The lens array 102 is disposed so that the distance $\sigma_1$ is $\sigma_1$=3.2666 (mm) and the distance $\sigma_2$ is $\sigma_2$=0.1475 (mm). The sampling pitch of the imaging optical system 101 on the pupil plane in this case is 0.9952 (mm). Therefore, the value that is obtained by dividing the diameter of the paraxial exit pupil plane of the imaging optical system 101 by the sampling pitch of the pupil plane of the imaging optical system 101 is 2.75 times of the value that is obtained by dividing the pitch of the lens array 102 by the pixel pitch of the image pickup element 103.

The value of Expression (15) is −1.00, and the value of Expression (20) is 0.051. As an example, the effect of the above configuration will be described on condition that the diameter $\epsilon$ of the permissible circle of confusion is $\epsilon$=5$\Delta$. The depth of focus in this case is 0.0928 (mm). On the other hand, the maximum interval of the focus positions where the effect of the super-resolution from subpixel shift is the minimum and the local maximum is $\rho_{max}$=0.6635 (mm). Adopting the above configuration, the interval of the focus planes on which the effect of the super-resolution from subpixel shift is the minimum and the local maximum can be close to the depth of focus. Furthermore, the generation of the dead zone on the image pickup element 103 can be reduced so as to obtain more parallax information.

Embodiment 4

Figure 22:
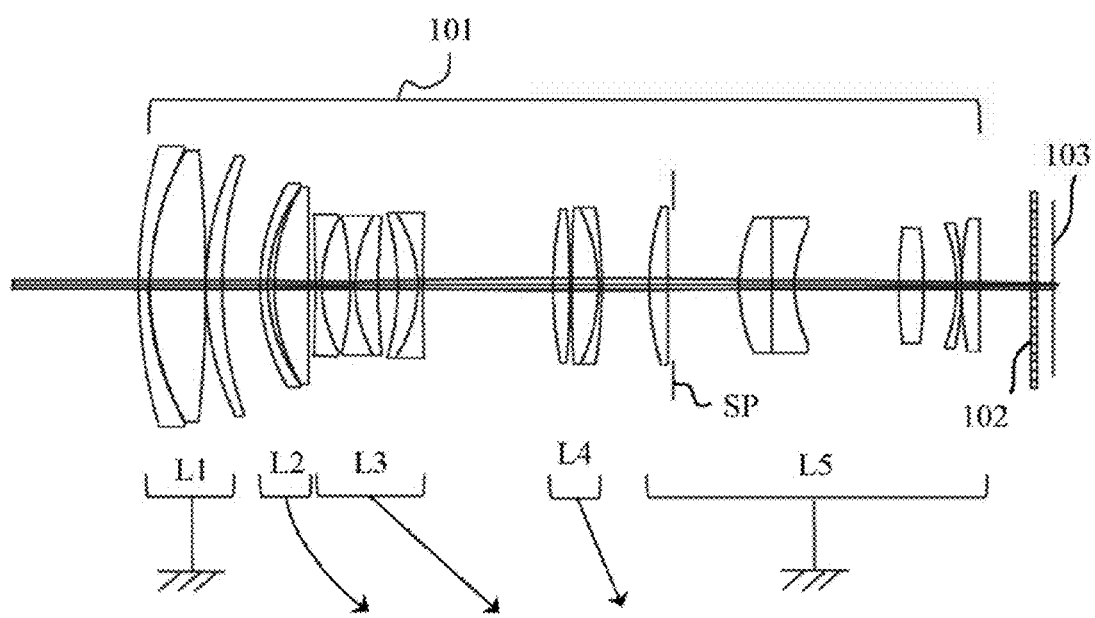
FIG. 22 is a cross-sectional diagram of the image pickup optical system in Embodiment 4.

Next, Embodiment 4 of the present invention will be described. The basic configuration of an image pickup apparatus in the present embodiment is the same as the image pickup apparatus of Embodiment 1 described with reference to FIG. 5, and therefore descriptions thereof will be omitted. An image pickup optical system in the present embodiment has a configuration illustrated in FIG. 2, and its cross section is illustrated in FIG. 22. In FIG. 22, the imaging optical system 101 is a zoom lens. Each of small lenses constituting the lens array 102 has both surfaces each having a convex shape, and an image formed by the imaging optical system 101 is viewed as an imaginary object so as to be imaged on the image pickup element 103. The imaging optical system 101 is, in order from the object side, configured by a first lens unit L1 having a positive refractive power, a second lens unit L2 having a positive refractive power, a third lens unit L3 having a negative refractive power, a fourth lens unit L4 having a positive refractive power, and a fifth lens unit L5 having a positive refractive power. While the magnification is varied, the first lens unit L1 and the fifth lens unit L5 are fixed, and the second lens unit L2, the third lens unit L3, and the fourth lens unit L4 are moved on an optical axis. An image processing method that generates an output image from an input image in the present embodiment is, similarly to Embodiment 2, indicated by the flowchart that is illustrated in FIG. 10. According to the above configuration, an image pickup apparatus that performs an image processing method capable of reducing the dependency of a focus position for resolution of a refocus image so that a high-resolution refocus image can be obtained is achieved.

In the present embodiment, the open F-value $F_0$ of the imaging optical system 101 is $F_0$=2.9 and a distance P from the exit pupil to the image side conjugate plane 202 is P=129.8994 (mm). Therefore, the diameter of the paraxial exit pupil plane of the imaging optical system 101 is 44.7929 (mm). The pitch $\Delta_{LA}$ of the lens array 102 is $\Delta_{LA}$=2.2400 (mm), and the pixel pitch $\Delta$ of the image pickup element 103 is $\Delta$=0.0064 (mm). The lens array 102 is disposed so that the distance $\sigma_1$ is $\sigma_1$=45.4720 (mm) and the distance $\sigma_2$ is $\sigma_2$=4.1048 (mm). The sampling pitch of the imaging optical system 101 on the pupil plane in this case is 6.3990 (mm). Therefore, the value that is obtained by dividing the diameter of the paraxial exit pupil plane of the imaging optical system 101 by the sampling pitch of the pupil plane of the imaging optical system 101 is 0.02 times of the value that is obtained by dividing the pitch of the lens array 102 by the pixel pitch of the image pickup element 103.

The value of Expression (15) is 0.20, and the value of Expression (20) is 0.350. As an example, the effect of the above configuration will be described on condition that the diameter $\epsilon$ of the permissible circle of confusion is $\epsilon=3\Delta$. The depth of focus in this case is 0.0557 (mm). On the other hand, the maximum interval of the focus positions where the effect of the super-resolution from subpixel shift is minimized and the local maximum is $\rho_{max}$=0.1318 (mm). Adopting the above configuration, the interval of the focus planes on which the effect of the super-resolution from subpixel shift is the minimum and the local maximum can be close to the depth of focus. Furthermore, the generation of the dead zone on the image pickup element 103 can be reduced so as to obtain more parallax information.

Embodiment 5

Figure 23:
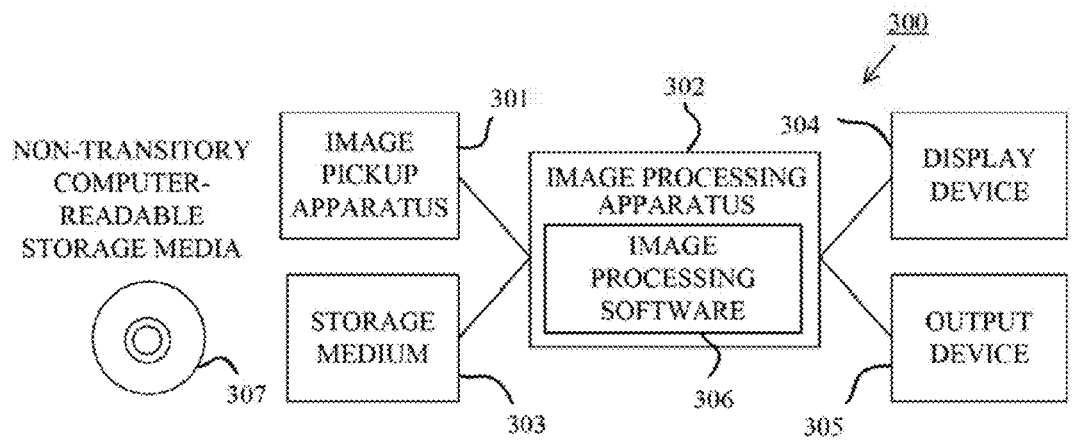
FIG. 23 is a block diagram of an image processing system in Embodiment 5.

Next, Embodiment 5 of the present invention will be described. The present embodiment describes an image processing apparatus (an image processing system) that performs the image processing method described above. FIG. 23 is a block diagram of an image processing system 300 in the present embodiment. As illustrated in FIG. 23, the image processing system 300 includes an image pickup apparatus 301. The image pickup apparatus 301 includes the image pickup optical system that includes the configuration of FIG. 2. An image processing apparatus 302 is a computer device (an information processing apparatus) that performs the image reconstruction described above. The image processing apparatus 302 includes a storage portion that stores image pickup condition information of the input image obtained by the image pickup apparatus 301. The image processing apparatus 302 performs a predetermined reconstruction processing for this input image, and outputs the processing result (the output image) to any one or a plurality of an output device 305, a display device 304, and a storage medium 303.

The storage medium 303 is, for example a semiconductor memory, a hard disk, or a server on a network. The output device 305 is for example a printer. The display device 304 is connected to the image processing apparatus 302, and the reconstructed image is inputted to the display device 304. A user can work while confirming the reconstructed image via the display device 304. Image processing software 306 (an image processing program) performs a development processing and other image processings if needed, as well as the reconstruction processing (the image processing method) described above. The display device 304 is for example a liquid crystal display or a projector. The present embodiment can also be achieved by performing the following processing. In other words, it is a processing in which software (a program) that achieves the function of the embodiments described above is provided to the system or the apparatus via a network or each of various kinds of storage media 307 (non-transitory computer-readable storage media) such as a CD-ROM so that a computer (CPU, MPU, or the like) of the system or the apparatus can read the program to be executed.

Figure 24:
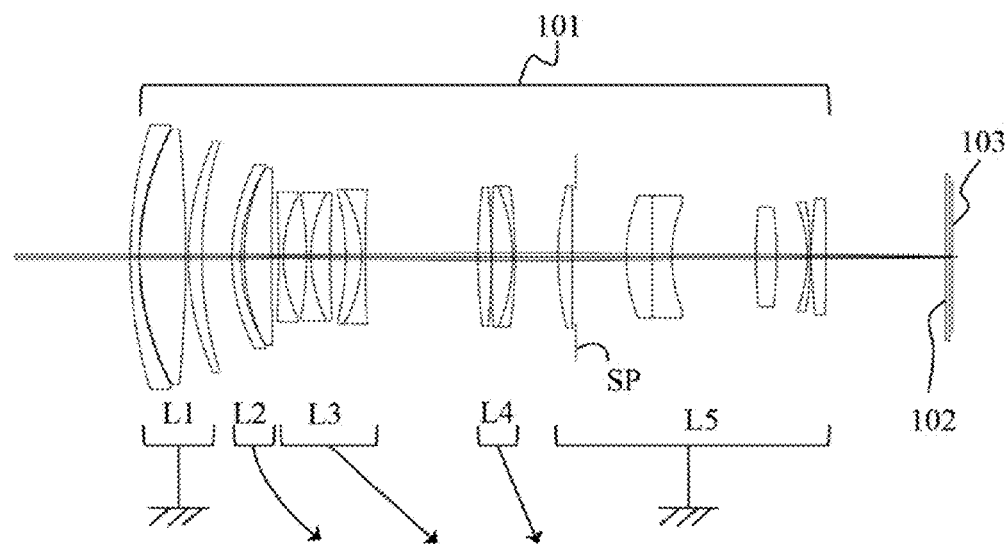
FIG. 24 is a cross-sectional diagram of an image pickup optical system in Embodiment 5.

FIG. 24 is a cross-sectional diagram of the image pickup optical system in the present embodiment. In FIG. 24, the imaging optical system 101 is a zoom lens. Each of small lenses constituting the lens array 102 has a surface at the object side having a planar shape and a surface at the image side having a convex shape, and an image formed by the imaging optical system 101 is viewed as an imaginary object so as to be imaged on the image pickup element 103. The imaging optical system 101 is, in order from the object side, configured by a first lens unit L1 having a positive refractive power, a second lens unit L2 having a positive refractive power, a third lens unit L3 having a negative refractive power, a fourth lens unit L4 having a positive refractive power, and a fifth lens unit L5 having a positive refractive power. While the magnification is varied, the first lens unit L1 and the fifth lens unit L5 are fixed, and the second lens unit L2, the third lens unit L3, and the fourth lens unit L4 are moved on an optical axis. An image processing method that generates an output image from an input image in the present embodiment is, similarly to Embodiment 2, indicated by the flowchart that is illustrated in FIG. 10. In the present embodiment, an image processing portion that is provided in the image processing apparatus 302 performs each step illustrated in FIG. 10. According to the above configuration, an image processing apparatus capable of reducing the dependency of a focus position for resolution of a refocus image so that a high-resolution refocus image can be obtained is achieved.

In the present embodiment, the open F-value $F_0$ of the imaging optical system 101 is $F_0$=2.9 and a distance P from the exit pupil to the image side conjugate plane 202 is P=129.8994 (mm). Therefore, the diameter of the paraxial exit pupil plane of the imaging optical system 101 is 44.7929 (mm). The pitch $\Delta_{LA}$ of the lens array 102 is $\Delta_{LA}$=0.4480 (mm), and the pixel pitch $\Delta$ of the image pickup element 103 is $\Delta$=0.0064 (mm). The lens array 102 is disposed so that the distance $\sigma_1$ is $\sigma_1$=16.8896 (mm) and the distance $\sigma_2$ is $\sigma_2$=0.9861 (mm). The sampling pitch of the imaging optical system 101 on the pupil plane in this case is 3.4456 (mm). Therefore, the value that is obtained by dividing the diameter of the paraxial exit pupil plane of the imaging optical system 101 by the sampling pitch of the pupil plane of the imaging optical system 101 is 0.1857 times of the value that is obtained by dividing the pitch of the lens array 102 by the pixel pitch of the image pickup element 103.

The value of Expression (15) is 1.90, and the value of Expression (20) is 0.130. As an example, the effect of the above configuration will be described on condition that the diameter $\epsilon$ of the permissible circle of confusion is $\epsilon=3\Delta$. The depth of focus in this case is 0.0557 (mm). On the other hand, the maximum interval of the focus positions where the effect of the super-resolution from subpixel shift is the minimum and the local maximum is $\rho_{max}$=0.2585 (mm). Adopting the above configuration, the interval of the focus planes on which the effect of the super-resolution from subpixel shift is the minimum and the local maximum can be close to the depth of focus. Furthermore, the generation of the dead zone on the image pickup element 103 can be reduced so as to obtain more parallax information.

In each of Embodiments 2 to 5 described above, it is preferred that $\epsilon$ be not less than the maximum value of the apparent pixel pitch and not more than $|\delta_1/\delta_2|$ of five times.

Embodiment 6

Figure 25:
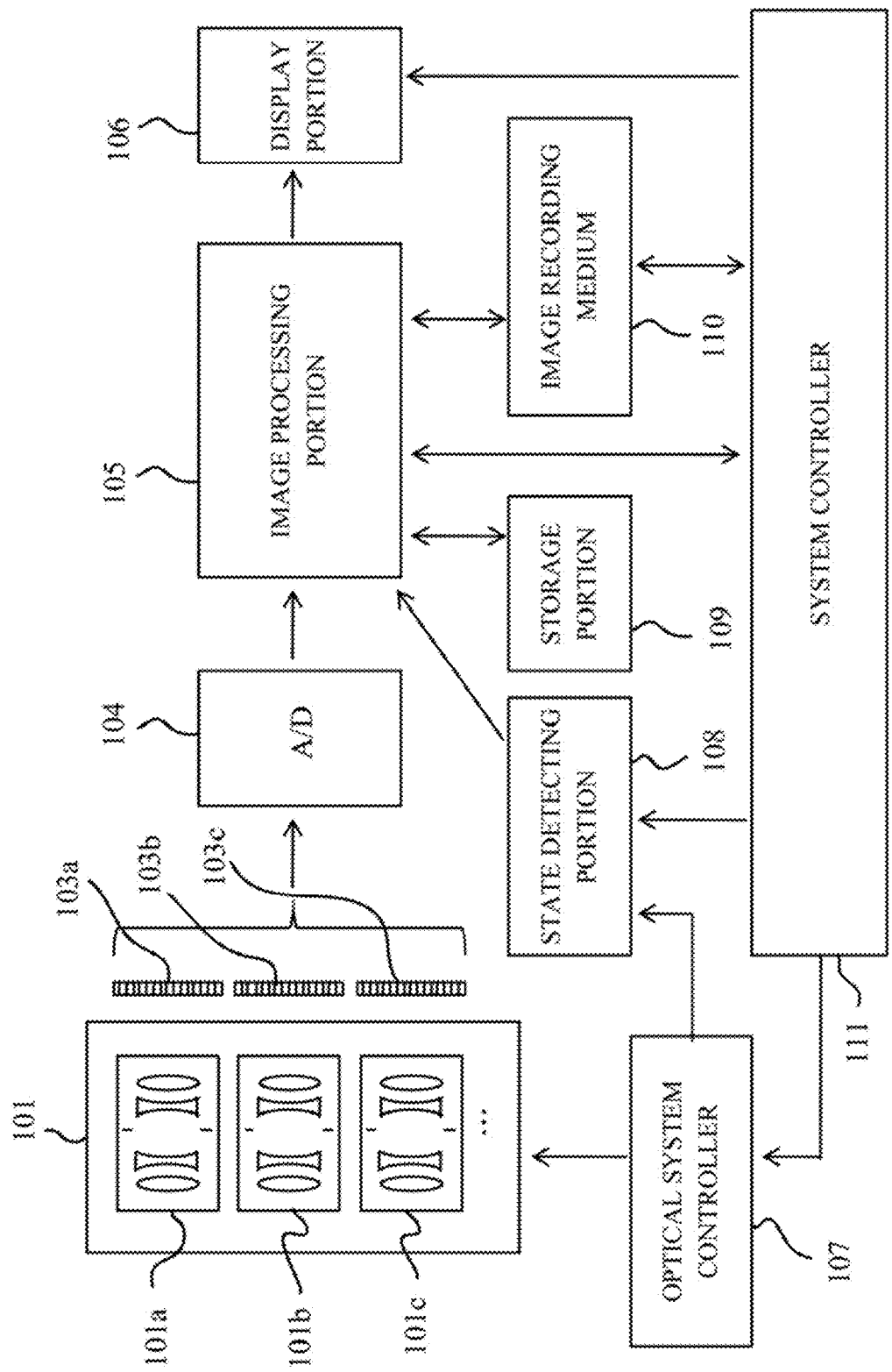
FIG. 25 is a block diagram of an image pickup apparatus in Embodiment 6.
Figure 26:
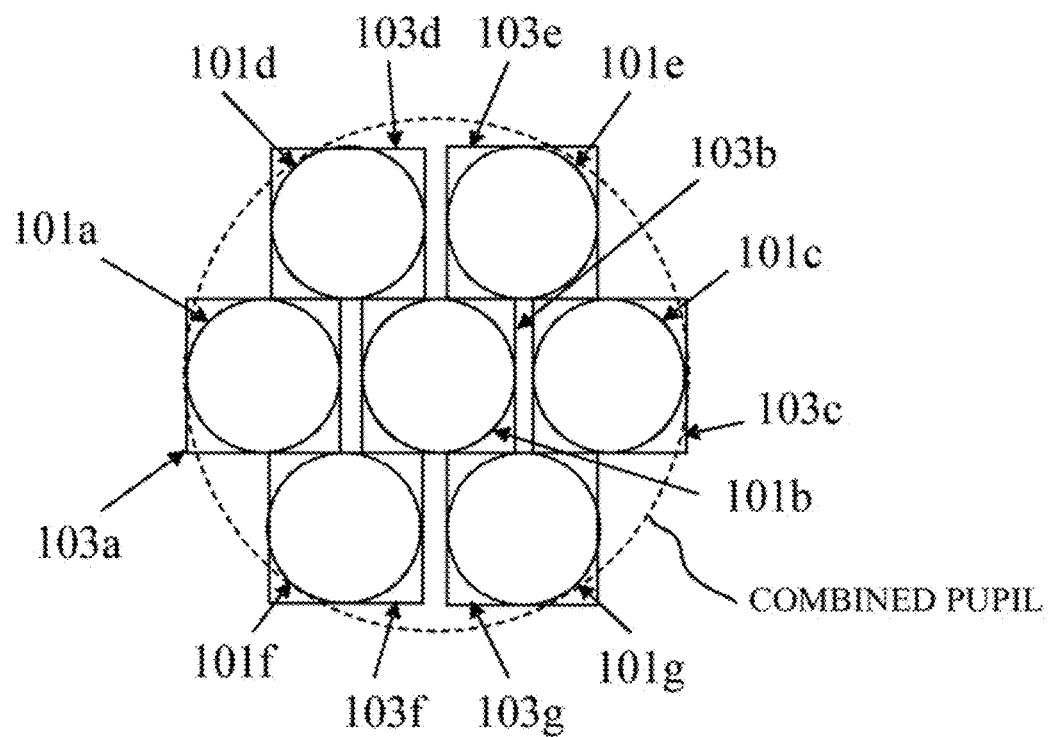
FIG. 26 is a schematic configuration diagram of an image pickup optical system in Embodiment 6.

Next, Embodiment 6 of the present embodiment will be described. FIG. 25 is a block diagram of an image pickup apparatus in the present embodiment. FIG. 26 is a schematic configuration diagram of an image pickup optical system in the present embodiment, which is a view of seeing the imaging optical system 101 from the object side. In FIG. 25, a ray from an object space (not shown) enters the imaging optical system 101. The imaging optical system 101 is, as illustrated in FIG. 26, configured by including a plurality of optical systems 101a to 101g each having a positive refractive power. The imaging optical system 101 is configured to have the sixfold symmetry when an optical axis of the optical system 101b is set to a rotational axis. However, the configuration of the imaging optical system 101 is not limited to this, and the number or the arrangement of the optical systems can be appropriately changed. At the image side of the optical systems 101a to 101g, image pickup elements 103a to 103g are arranged, respectively. However, in the present embodiment, the plurality of image pickup elements 103a to 103g do not need to be provided, and alternatively a single image pickup element may be provided if an image formed by the optical systems 101a to 101g can be received. Therefore, the image pickup apparatus of the present embodiment has only to include at least one image pickup element.

Figure 4:
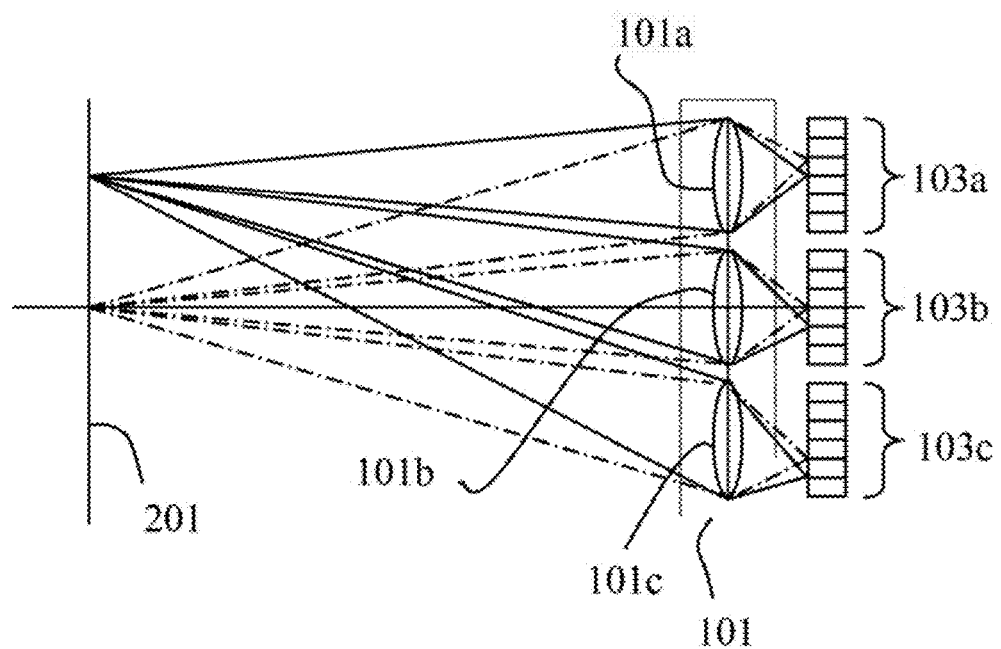
FIG. 4 is a schematic configuration diagram of an image pickup optical system in Embodiment 6.

FIG. 4 is a schematic diagram of viewing the image pickup optical system of the present embodiment, which is viewed at a cross section including optical axes of the optical systems 101a to 101c. Rays that are refracted by the optical systems 101a, 101b, and 101c are received by the corresponding image pickup elements 103a, 103b, and 103c, respectively. A plurality of images obtained by the image pickup elements 103a to 103c are parallax images that are obtained by observing an object space from different points of view. Combining the plurality of images, a two-dimensional light intensity distribution and angle information in the object space, i.e. the light field, can be obtained. In the present embodiment, the plurality of parallax images are an input image. The resolution of the configuration illustrated in FIG. 4 is deteriorated with respect to the resolution of an image pickup system which obtains only the two-dimensional light intensity if the total pixel number of the image pickup element to be used is the same. This is because some pixels need to be used to obtain the angle component of the light field.

Figure 27:
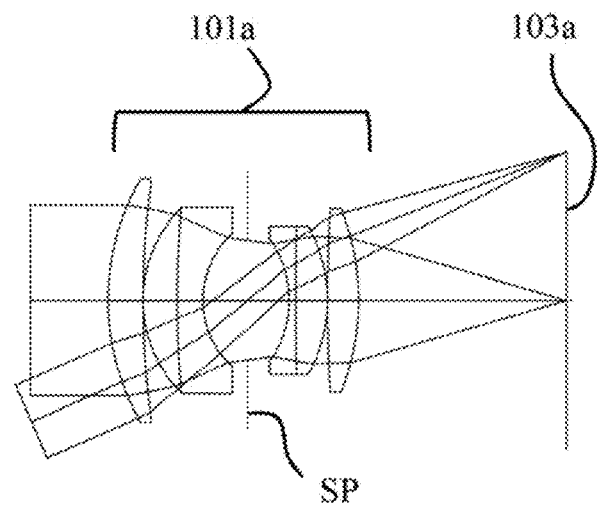
FIG. 27 is a cross-sectional diagram of an optical system in Embodiment 6.

FIG. 27 is a cross-sectional diagram of the optical system in the present embodiment, which illustrates a cross section of the optical system 101a and the image pickup element 103a. The cross sections of the other optical systems 101b to 101g and the other image pickup elements 103b to 103g are the same, and therefore descriptions thereof will be omitted. However, the configurations of the optical systems may also be different from each other. The optical system 101a illustrated in FIG. 27 is a single focus lens. As illustrated in FIG. 4, the ray from the object plane 201 enters the different optical system that constitutes the imaging optical system 101 in accordance with a position and an angle of the ray on the object plane 201, and then it is received by the different pixel of the image pickup element so that the light field can be obtained.

Next, a method of generating the refocus image in the present embodiment will be described. FIG. 28 is a diagram of describing the generation of the refocus image, which is a detailed diagram of the configuration of FIG. 4. A combined object side principal plane in FIG. 28 is defined as a plane that passes through the object side principal point of each of the optical systems 101a to 101g. Similarly, the combined image side principal plane is a plane that passes through the image side principal point of each of the optical systems 101a to 101g. In the configuration of the present embodiment, the object side principal plane and the image side principal plane of the imaging optical system 101 are represented by the combined object side principal plane and the combined image side principal plane, respectively. A dashed-dotted line in FIG. 28 indicates an angle of view of each optical system.

When the focus position at the image side is aligned on the virtual imaging plane 203, the pixel values obtained by the image pickup elements 103a to 103g may be projected on an object side refocus plane 204 via the optical systems 101a to 101g corresponding to each of the image pickup elements 103a to 103g so as to combine them. The object side refocus plane 204 is a plane that is conjugate to the virtual imaging plane 203 via the optical systems 101a to 101g. Moving the virtual imaging plane 203, a refocus image that is focused on an arbitrary position can be generated.

For example, in order to generate the image that is focused on the object plane 201 of FIG. 4, the virtual imaging plane 203 may be set on the image pickup elements 103a to 103g. In this case, the object plane 201 coincides with the object side refocus plane 204. In FIG. 28, pixels projected during generating the refocus image is indicated by dashed lines, and for easy understanding, they are indicated by being shifted without being overlapped with each other. The refocus image may also be generated by using a method of combining each pixel while performing a parallel translation of each pixel so that pixels are overlapped with each other similarly to the case of the generating method by projecting the pixels described above. In this case, when the optical systems which the light beams entering the pixels pass through are the same, amounts of the parallel translation of the pixels are the same. As described above, the operation of the pixels during generating the refocus image in the present embodiment is determined in accordance with the optical system through which the light beam entering the pixel passes.

Figure 29:
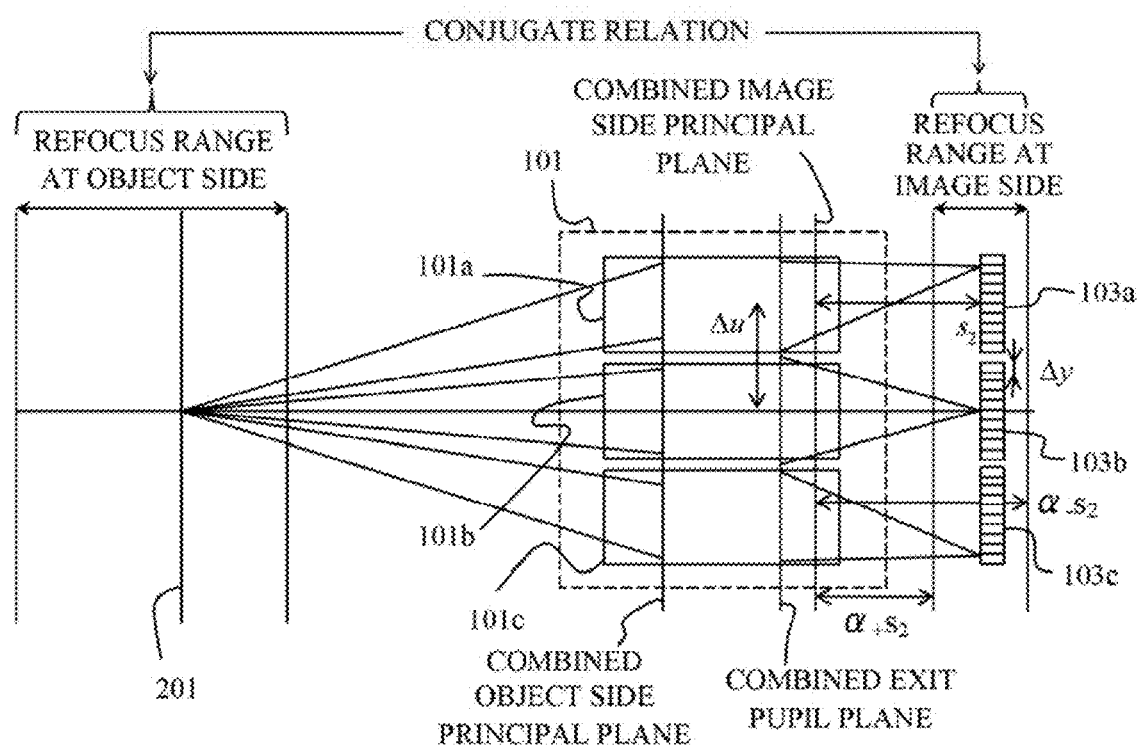
FIG. 29 is a diagram of describing a refocus range in Embodiment 6.

Subsequently, the range in which the refocus processing can be performed will be described. The refocus range of the image pickup optical system in the present embodiment is also represented by Expression (1) similarly to Embodiment 1, and the relationship is as illustrated in FIG. 29. FIG. 29 is a diagram of describing the refocus range in the present embodiment.

In the image pickup optical system of the present embodiment, since $\Delta y = \Delta$ and $\Delta u = P_{syn}/(NF_{syn})$ are met and $\Delta \ll P_{syn}$ is also met, Expression (1) can be approximated by the following Expression (21).

$$\alpha_{\pm} s_2 = s_2 \mp NF_{syn} \Delta y = s_2 \mp NF_{syn} \Delta \quad (21)$$

In Expression (21), symbols $F_{syn}$ and $P_{syn}$ are an F-number that is calculated from a combined pupil of the imaging optical system 101 that is formed by combining pupils of the optical systems 101a to 101g and an exit pupil distance, respectively. As a method of combining the pupils of the optical systems 101a to 101g, there is a method of combining openings or the like. The dashed line of FIG. 26 and the combined exit pupil plane of FIG. 29 indicate a concept of the combined pupil that is formed by the optical systems 101a to 101g. In the configuration of the present embodiment, the pupil of the imaging optical system 101 is a combined pupil that is formed by combining the plurality of optical systems 101a to 101g. As a result, the ray from the same position on the object plane 201 passes through different pupil regions of the imaging optical system 101 in accordance with the angle of the ray. In Expression (21), symbol N denotes a division number of the combined pupil in a one-dimensional direction. Similarly to Embodiment 1, when a value exceeds the range of Expression (21), a correct refocus image cannot be generated.

Figure 28A:
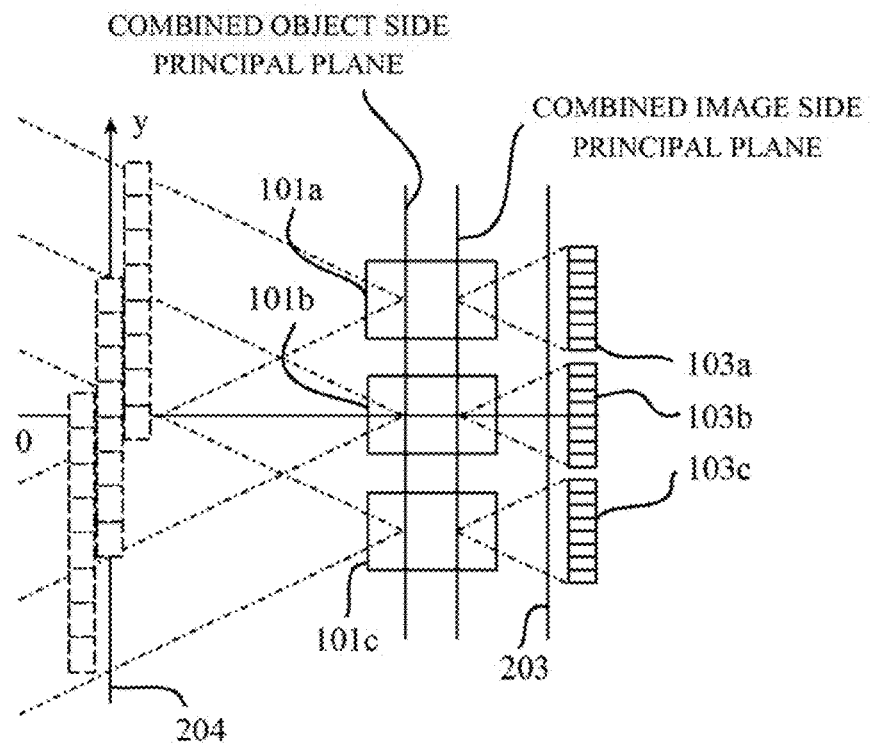
FIGS. 28A and 28B are diagrams of describing refocus image generation in Embodiment 6.
Figure 28B:
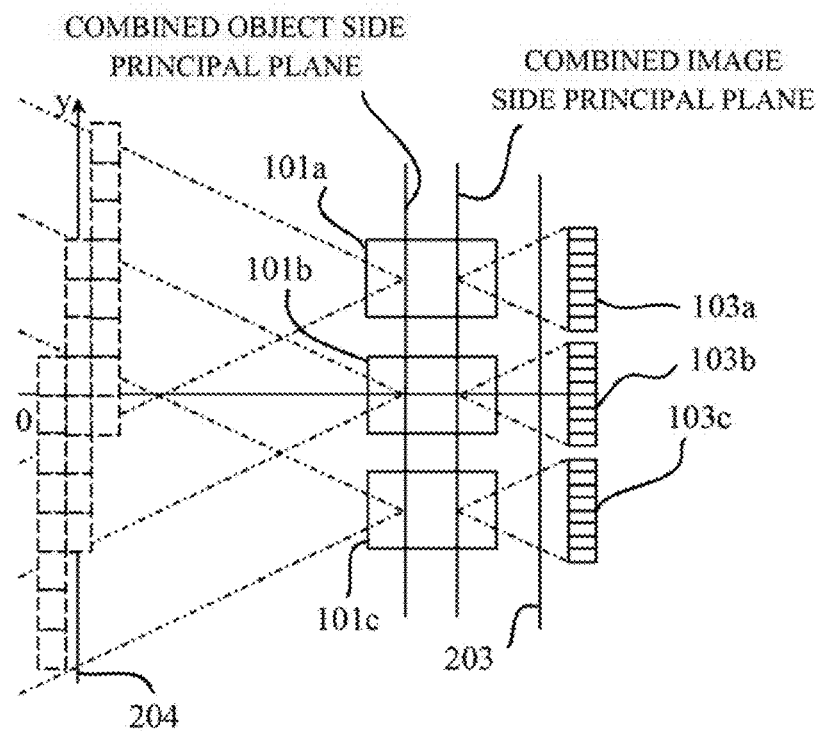

The improvement of the spatial resolution of the reconstructed image by the super-resolution from subpixel shift is similar to Embodiment 2. When the overlap number of the pixels correspond to the pixel shift amount as illustrated in FIG. 28A, the effect of the super-resolution from subpixel shift is maximized. On the other hand, when the pixel shift amount is an integer as illustrated in FIG. 28B, the effect of the super-resolution from subpixel shift cannot be obtained. An image processing method that generates an output image from an input image in the present embodiment is, similarly to Embodiment 2, indicated by the flowchart that is illustrated in FIG. 10.

In Step S001 of FIG. 10, a plurality of parallax images that are obtained by the image pickup elements 103a to 103g are obtained as an input image. However, if the plurality of parallax images are obtained by a single image pickup element, the input image is an image that is obtained by the image pickup element. Subsequently, in Step S002, the image reconstructing method described in the present embodiment is selected.

A first focus position and a second focus position that are calculated in Steps S003 and S004 are focus positions at the image side. However, it may also be considered on a surface at the object side that is conjugate to them via the imaging optical system 101. In this case, the interval of the surfaces at the object side that are conjugate to each other for the first focus position and the second focus position has only to be in the depth of field of the imaging optical system 101. The same is true for each of Embodiments 1 to 5. In addition, the conditional expression described in Steps S003 and S004 of Embodiment 1 is also applied to the present embodiment.

According to the above configuration, an image processing method that is capable of reducing the dependency of a focus position for resolution of a refocus image so as to obtain a high-resolution refocus image and an image pickup apparatus that performs the image processing method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In Embodiment 6, it is preferred that $\epsilon$ is not less than the maximum value of the apparent pixel pitch and not more than $\Delta$ of five times.

This application claims the benefit of Japanese Patent Application No. 2011-179460, filed on Aug. 19, 2011, which is hereby incorporated by reference herein in its entirety.

What is claimed is:

1. An image processing method capable of reconstructing an input image to generate a plurality of output images that have different focus positions, the image processing method comprising the steps of:
    obtaining the input image that is an image in which information of an object space is obtained from a plurality of points of view using an image pickup apparatus that includes an image pickup element having a plurality of pixels and an imaging optical system;
    calculating a first position of a virtual imaging plane that corresponds to a specified focus position;
    setting the virtual imaging plane to a second position that is in a range of a depth of focus of the imaging optical system with reference to the first position so that a maximum value of an apparent pixel pitch that is formed by reconstructing the input image is decreased; and
    generating the output image in a state where the virtual imaging plane is set to the second position.

2. The image processing method according to claim 1, wherein the second position is a position where the maximum value of the apparent pixel pitch is at a minimum in the range of the depth of focus of the imaging optical system with reference to the first position.

3. An image pickup apparatus capable of reconstructing an input image to generate a plurality of output images that have different focus positions, the image pickup apparatus comprising:
    an imaging optical system;
    an image pickup element that includes a plurality of pixels;
    a lens array configured so that rays from the same position of an object plane enter pixels of the image pickup element that are different from each other in accordance with a pupil region of the imaging optical system through which the ray passes; and
    an image processing portion configured to generate the output image using the image processing method according to claim 1 for the input image obtained by the image pickup element,
    wherein the lens array is disposed on an image side conjugate plane of the imaging optical system with respect to the object plane.

4. The image pickup apparatus according to claim 3, wherein the lens array is configured by including a plurality of small lenses, and
    wherein a surface at an image side of each of the small lenses has a convex shape.

5. An image pickup apparatus capable of reconstructing an input image to generate a plurality of output images that have different focus positions, the image pickup apparatus comprising:
    an imaging optical system;
    an image pickup element that includes a plurality of pixels;
    a lens array configured so that rays from the same position of an object plane enter pixels of the image pickup element that are different from each other in accordance with a pupil region of the imaging optical system through which the ray passes; and
    an image processing portion configured to generate the output image using the image processing method according to claim 1 for the input image obtained by the image pickup element,
    wherein the lens array is disposed so that an image side conjugate plane of the imaging optical system with respect to the object plane is conjugate to the image pickup element.

6. The image pickup apparatus according to claim 5, wherein the lens array is configured by including a plurality of small lenses, and
    wherein a surface at an image side of each of the small lenses has a convex shape.

7. An image pickup apparatus capable of reconstructing an input image to generate a plurality of output images that have different focus positions, the image pickup apparatus comprising:
    an imaging optical system that includes a plurality of optical systems each having a positive refractive power;
    at least one image pickup element that includes a plurality of pixels; and
    an image processing portion configured to generate the output image using the image processing method according to claim 1 for the input image obtained by the image pickup element,
    wherein the plurality of optical systems are arranged so that rays from the same position of an object plane enter pixels of the image pickup element that are different from each other in accordance with a pupil region of the imaging optical system through which the ray passes, and wherein a pupil of the imaging optical system is a combined pupil that is obtained by combining pupils of the plurality of optical systems.

8. The image pickup apparatus according to claim 5, wherein following expression is met:

$$-1.0 \leq |\sigma_1|\left[\frac{1}{\sigma_2}\left(1-\frac{\sigma_1}{P}\right)-\frac{1}{F_0\Delta_{LA}}\right] \leq 3.0$$

where $F_0$ is an open F-value of the imaging optical system, $\sigma_1$ is a distance between an object side principal plane of the lens array and the image side conjugate plane, $\sigma_2$ is a distance between an image side principal plane of the lens array and the image pickup element, P is a distance between an exit pupil of the imaging optical system and the image side conjugate plane, and $\Delta_{LA}$ is a pitch of the lens array.

9. The image pickup apparatus according to claim 6, wherein the lens array is configured by including the plurality of small lenses, and wherein a surface at an object side of each of the small lenses has one of a planar shape and a convex shape.

10. An image processing apparatus capable of reconstructing an input image to generate a plurality of output images that have different focus positions, the image processing apparatus comprising:

a storage portion configured to store image pickup condition information of the input image; and an image processing portion configured to generate the output image using the image pickup condition information for the input image, wherein the image processing portion performs an image processing method comprising the steps of:

obtaining the input image that is an image in which information of an object space is obtained from a plurality of points of view using an image pickup apparatus that includes an image pickup element having a plurality of pixels and an imaging optical system;

calculating a first position of a virtual imaging plane that corresponds to a specified focus position;

setting the virtual imaging plane to a second position that is in a range of a depth of focus of the imaging optical system with reference to the first position so that a maximum value of an apparent pixel pitch that is formed by reconstructing the input image is decreased; and generating the output image in a state where the virtual imaging plane is set to the second position.

11. A non-transitory computer-readable storage medium storing a program for causing an information processing apparatus to execute a method capable of reconstructing an input image to generate a plurality of output images that have different focus positions, the method comprising the steps of:

obtaining the input image that is an image in which information of an object space is obtained from a plurality of points of view using an image pickup apparatus that includes an image pickup element having a plurality of pixels and an imaging optical system;

calculating a first position of a virtual imaging plane that corresponds to a specified focus position;

setting the virtual imaging plane to a second position that is in a range of a depth of focus of the imaging optical system with reference to the first position so that a maximum value of an apparent pixel pitch that is formed by reconstructing the input image is decreased; and generating the output image in a state where the virtual imaging plane is set to the second position.

12. An image pickup apparatus comprising:

an imaging optical system;

an image pickup element that includes a plurality of pixels; and a lens array configured so that rays from the same position of an object plane enter pixels of the image pickup element that are different from each other in accordance with a pupil region of the imaging optical system through which the ray passes, wherein the lens array is disposed so that an image side conjugate plane of the imaging optical system with respect to the object plane is conjugate to the image pickup element, and wherein following expression is met:

$$-1.0 \leq |\sigma_1|\left[\frac{1}{\sigma_2}\left(1-\frac{\sigma_1}{P}\right)-\frac{1}{F_0\Delta_{LA}}\right] \leq 3.0$$

where $F_0$ is an open F-value of the imaging optical system, $\sigma_1$ is a distance between an object side principal plane of the lens array and the image side conjugate plane, $\sigma_2$ is a distance between an image side principal plane of the lens array and the image pickup element, P is a distance between an exit pupil of the imaging optical system and the image side conjugate plane, and $\Delta_{LA}$ is a pitch of the lens array.

* * * * *